US008068571B2

(12) United States Patent
Chester et al.

(10) Patent No.: US 8,068,571 B2
(45) Date of Patent: Nov. 29, 2011

(54) FEATURELESS COHERENT CHAOTIC AMPLITUDE MODULATION

(75) Inventors: David B. Chester, Palm Bay, FL (US); Alan J. Michaels, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 742 days.

(21) Appl. No.: 12/137,593

(22) Filed: Jun. 12, 2008

(65) Prior Publication Data
US 2009/0310650 A1    Dec. 17, 2009

(51) Int. Cl.
H03K 7/02    (2006.01)
H03K 9/02    (2006.01)
(52) U.S. Cl. .......... 375/353; 327/50; 327/178; 329/311; 332/115; 370/533
(58) Field of Classification Search .................. 375/353, 375/130, 140; 380/263
See application file for complete search history.

(56) References Cited

U.S. PATENT DOCUMENTS

| | | |
|---|---|---|
| 3,564,223 A | 2/1971 | Harris et al. |
| 4,095,778 A | 6/1978 | Wing |
| 4,646,326 A | 2/1987 | Backof, Jr. et al. |
| 4,703,507 A | 10/1987 | Holden |
| 5,007,087 A | 4/1991 | Bernstein et al. |
| 5,048,086 A | 9/1991 | Bianco et al. |
| 5,077,793 A | 12/1991 | Falk et al. |
| 5,276,633 A | 1/1994 | Fox et al. |
| 5,297,153 A | 3/1994 | Baggen et al. |
| 5,297,206 A | 3/1994 | Orton |
| 5,319,735 A | 6/1994 | Preuss et al. |
| 5,412,687 A | 5/1995 | Sutton et al. |
| 5,598,476 A | 1/1997 | LaBarre et al. |

(Continued)

FOREIGN PATENT DOCUMENTS

EP    0 849 664 A2    6/1998
(Continued)

OTHER PUBLICATIONS

Deckert, T., et al: "Throughput of WLAN with TDMA and Superimposed Transmission with Resource and Traffic Constraints" Personal, Indoor and Mobile Radio Communications, 2006 IEEE 17th Inter National Symposium on, IEEE, PI, Sep. 1, 2006, pp. 1-5, XP031023581, ISBN: 978-1-4244-0329-5.

(Continued)

Primary Examiner — Shuwang Liu
Assistant Examiner — Gina McKie
(74) Attorney, Agent, or Firm — Fox Rothschild, LLP; Robert J. Sacco

(57) ABSTRACT

Systems (400, 500, 600) and methods (300) for generating a chaotic amplitude modulated signal absent of cyclostationary features by preserving a constant variance. The methods involve: generating a PAM signal including pulse amplitude modulation having a periodically changing amplitude; generating a first part of a constant power envelope signal (FPCPES) by dividing the PAM signal by a square root of a magnitude of the PAM signal; generating a second part of the constant power envelope signal (SPCPES) having a magnitude equal to a square root of one minus the magnitude of the PAM signal; and generating first and second spreading sequences (FSS and SSS). The methods also involve combining the FPCPES with the FSS to generate a first product signal (FPS) and combining the SPCPES with the SSS to generate a second product signal (SPS). A constant power envelope signal is generated using the FPS and SPS.

23 Claims, 10 Drawing Sheets

U.S. PATENT DOCUMENTS

| | | | | |
|---|---|---|---|---|
| 5,757,923 | A | 5/1998 | Koopman, Jr. | |
| 5,811,998 | A | 9/1998 | Lundberg et al. | |
| 5,852,630 | A | 12/1998 | Langberg et al. | |
| 5,900,835 | A | 5/1999 | Stein | |
| 5,924,980 | A | 7/1999 | Coetzee | |
| 5,937,000 | A | 8/1999 | Lee et al. | |
| 6,014,446 | A | 1/2000 | Finkelstein | |
| 6,023,612 | A | 2/2000 | Harris et al. | |
| 6,038,317 | A | 3/2000 | Magliveras et al. | |
| 6,078,611 | A | 6/2000 | La Rosa et al. | |
| 6,141,786 | A | 10/2000 | Cox et al. | |
| 6,304,216 | B1 | 10/2001 | Gronemeyer | |
| 6,304,556 | B1 | 10/2001 | Haas | |
| 6,314,187 | B1 | 11/2001 | Menkhoff et al. | |
| 6,331,974 | B1 | 12/2001 | Yang et al. | |
| 6,377,782 | B1 | 4/2002 | Bishop et al. | |
| 6,570,909 | B1 | 5/2003 | Kansakoski et al. | |
| 6,614,914 | B1 | 9/2003 | Rhoads et al. | |
| 6,665,692 | B1 | 12/2003 | Nieminen | |
| 6,744,893 | B1 | 6/2004 | Fleming-Dahl | |
| 6,754,251 | B1 | 6/2004 | Sriram et al. | |
| 6,766,345 | B2 | 7/2004 | Stein et al. | |
| 6,842,479 | B2 | 1/2005 | Bottomley | |
| 6,980,656 | B1 * | 12/2005 | Hinton et al. | 380/263 |
| 6,986,054 | B2 | 1/2006 | Kaminaga et al. | |
| 6,993,016 | B1 | 1/2006 | Liva et al. | |
| 7,023,323 | B1 | 4/2006 | Nysen | |
| 7,027,598 | B1 | 4/2006 | Stojancic et al. | |
| 7,069,492 | B2 | 6/2006 | Piret | |
| 7,076,065 | B2 | 7/2006 | Sherman et al. | |
| 7,078,981 | B2 | 7/2006 | Farag | |
| 7,079,651 | B2 | 7/2006 | Den Boer et al. | |
| 7,095,778 | B2 | 8/2006 | Okubo et al. | |
| 7,133,522 | B2 | 11/2006 | Lambert | |
| 7,170,997 | B2 | 1/2007 | Petersen et al. | |
| 7,190,681 | B1 | 3/2007 | Wu | |
| 7,200,225 | B1 | 4/2007 | Schroeppel | |
| 7,233,969 | B2 | 6/2007 | Rawlins et al. | |
| 7,233,970 | B2 | 6/2007 | North et al. | |
| 7,245,723 | B2 * | 7/2007 | Hinton et al. | 380/263 |
| 7,269,198 | B1 | 9/2007 | Elliott et al. | |
| 7,269,258 | B2 | 9/2007 | Ishihara et al. | |
| 7,272,168 | B2 | 9/2007 | Akopian | |
| 7,277,540 | B1 | 10/2007 | Shiba et al. | |
| 7,529,292 | B2 | 5/2009 | Bultan et al. | |
| 7,643,537 | B1 | 1/2010 | Giallorenzi et al. | |
| 7,779,060 | B2 | 8/2010 | Kocarev et al. | |
| 7,830,214 | B2 * | 11/2010 | Han et al. | 331/78 |
| 7,853,014 | B2 | 12/2010 | Blakley et al. | |
| 7,974,146 | B2 | 7/2011 | Barkley | |
| 2002/0012403 | A1 * | 1/2002 | McGowan et al. | 375/295 |
| 2002/0099746 | A1 | 7/2002 | Tie et al. | |
| 2003/0044004 | A1 | 3/2003 | Blakley et al. | |
| 2004/0001556 | A1 | 1/2004 | Harrison et al. | |
| 2004/0059767 | A1 | 3/2004 | Liardet | |
| 2004/0196212 | A1 | 10/2004 | Shimizu | |
| 2005/0031120 | A1 | 2/2005 | Samid | |
| 2005/0050121 | A1 | 3/2005 | Klein et al. | |
| 2005/0089169 | A1 | 4/2005 | Kim et al. | |
| 2005/0207574 | A1 | 9/2005 | Pitz et al. | |
| 2005/0274807 | A1 | 12/2005 | Barrus et al. | |
| 2006/0072754 | A1 * | 4/2006 | Hinton et al. | 380/263 |
| 2006/0093136 | A1 | 5/2006 | Zhang et al. | |
| 2006/0123325 | A1 | 6/2006 | Wilson et al. | |
| 2006/0209932 | A1 | 9/2006 | Khandekar et al. | |
| 2006/0251250 | A1 | 11/2006 | Ruggiero et al. | |
| 2007/0121945 | A1 * | 5/2007 | Han et al. | 380/263 |
| 2007/0230701 | A1 * | 10/2007 | Park et al. | 380/263 |
| 2008/0008320 | A1 * | 1/2008 | Hinton et al. | 380/263 |
| 2008/0016431 | A1 | 1/2008 | Lablans | |
| 2008/0095215 | A1 | 4/2008 | McDermott et al. | |
| 2008/0198832 | A1 | 8/2008 | Chester | |
| 2008/0263119 | A1 | 10/2008 | Chester et al. | |
| 2008/0294710 | A1 | 11/2008 | Michaels | |
| 2008/0294956 | A1 | 11/2008 | Chester et al. | |
| 2008/0304553 | A1 | 12/2008 | Zhao et al. | |
| 2008/0304666 | A1 | 12/2008 | Chester et al. | |
| 2008/0307022 | A1 | 12/2008 | Michaels et al. | |
| 2008/0307024 | A1 | 12/2008 | Michaels et al. | |
| 2009/0034727 | A1 | 2/2009 | Chester et al. | |
| 2009/0044080 | A1 | 2/2009 | Michaels et al. | |
| 2009/0110197 | A1 | 4/2009 | Michaels | |
| 2009/0122926 | A1 | 5/2009 | Azenkot et al. | |
| 2009/0196420 | A1 | 8/2009 | Chester et al. | |
| 2009/0202067 | A1 | 8/2009 | Michaels et al. | |
| 2009/0245327 | A1 | 10/2009 | Michaels | |
| 2009/0279688 | A1 | 11/2009 | Michaels et al. | |
| 2009/0279690 | A1 | 11/2009 | Michaels et al. | |
| 2009/0296860 | A1 | 12/2009 | Chester et al. | |
| 2009/0300088 | A1 | 12/2009 | Michaels et al. | |
| 2009/0309984 | A1 | 12/2009 | Bourgain et al. | |
| 2009/0310650 | A1 | 12/2009 | Chester et al. | |
| 2009/0316679 | A1 | 12/2009 | Van Der Wateren | |
| 2009/0323766 | A1 | 12/2009 | Wang et al. | |
| 2009/0327387 | A1 | 12/2009 | Michaels et al. | |
| 2010/0111296 | A1 | 5/2010 | Brown et al. | |
| 2010/0254430 | A1 | 10/2010 | Lee et al. | |

FOREIGN PATENT DOCUMENTS

| | | |
|---|---|---|
| EP | 0 949 563 | 10/1999 |
| EP | 2 000 900 A2 | 12/2008 |
| EP | 2 000 902 A2 | 12/2008 |
| GB | 1167272 A | 10/1969 |
| JP | 2004279784 A | 10/2004 |
| WO | WO-0135572 A2 | 5/2001 |
| WO | WO-2006 110954 | 10/2006 |
| WO | WO 2008 065191 | 6/2008 |
| WO | WO-2008099367 A2 | 8/2008 |
| WO | WO-2008130973 A1 | 10/2008 |
| WO | WO 2009 146283 | 12/2009 |

OTHER PUBLICATIONS

Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004, XPOO2558039.

Abel, et al., "Chaos Communications—Principles, Schemes, and System Analysis" Proceedings for the IEEE, IEEE. New York, NY. vol. 90, No. 5, May 1, 2002, XP011064997, ISSN: 0018-9219.

Barile, Margherita, "Bijective," From MathWorld—A Wolfram Web Resource, created by Eric W. Weisstein. http://mathworld.wolfram.com/Bijective.html.

Chren, W A: "PN Code Generator with Low Delay-power Product for Spread-Spectrum Communication Systems" IEEE Transactions on Circuits and Systems II: Express Briefs, IEEE Service Center, New York, NY US, vol. 46, No. 12, Dec. 1, 1999, pp. 1506-1511, XP000932002, ISSN: 1057-7130.

De Matteis, A., et al., "Pseudorandom Permutation". Journal of Computational and Applied Mathematics, Elsevier, Netherlands, vol. 142, No. 2, May 15, 2002, pp. 367-375, XP007906923, ISSN: 0377-0427.

Knuth, D E: "The Art of Computer Programming, 3.2.2 Other Methods" The Art of Computer Programming. vol. 2: Seminumerical Algorithms, Boston, MA: Addison-Wesley, US, Jan. 1, 1998, pp. 26-40, XP002409615, ISBN: 978-0-0201-89684-8.

Knuth, D.E., "The Art of Computer Programming, Third Edition; vol. 2 Seminumerical Algorithms". Feb. 2005, Addison-Wesley, Boston 310200, XP002511903, pp. 142-146, 284-292.

Kolumban, et al., "The Role of Synchronization in Digital Communications Using Chaos—Part II: Chaotic Modulation and Chaotic Synchronization", IEEE Transactions on Circuits and Systems Part I: Regular Papers, IEEE Service Center, New York, NY US, vol. 45, No. 11, Nov. 1, 1998, XP011011827, ISSN: 1057-7122.

Kolumban, et al., "Chaotic Communications with Correlator Receivers: Theory and Performance Limits" Proceedings of the IEEE, vol. 90, No. 5, May 2002.

Leung, et al., "Time-varying synchronization of chaotic systems in the presence of system mismatch" Physical Review E (Statistical, Nonlinear, and Soft Matter Physics) APS through AIP USA, [online] Vo. 69, No. 2, Feb. 1, 2004, pp. 26201-1, XP002499416, ISSN: 1063-651X. Retrieved from the Internet: URL:http://prola.aps.org/pdf/PRE/v69/i2/e026201 [retrieved Oct. 13, 2008].

Manikandan, et al, "A Novel Pulse Based Ultrawide Band System Using Chaotic Spreading Sequences" Communication Systems Software and Middleware, 2007. COMSWARE 2007. 2nd International Conference on, IEEE, Pl, Jan. 1, 2007, pp. 1-5, XP031113946 ISBN: 978-1-4244-0613-5; p. 1, page 5.

Morsche et al., "Signals and Systems," lecture notes, University of Eindhoven, The Netherlands (1999).

Panella, et al., "An RNS Architecture for Quasi-Chaotic Oscillators" The Journal of VLSI Signal Processing, Kluwer Academic Publishes, BO, vol. 33, No. 1-2, Jan. 1, 2003, pp. 199-220, XP019216547, ISSN: 1573-109X.

Nakamura, et al, "Chaotic synchronization-based communications using constant envelope pulse" Electrical Engineering in Japan, [Online] vol. 163, No. 3, Feb. 12, 2008 , pp. 47-56, XP002539977 Japan. Retrieved from the Internet: URL:http://www3.interscience.wiley.com/cgi-bin/fulltext/117910986/PDFSTART>; [retrieved on Aug. 4, 2009] p. 47-p. 48; p. 50-p. 51.

Pleszczynski, S, "On the Generation of Permutations" Information Processing Letters, Amsterdam, NL, vol. 3, No. 6, Jul. 1, 1975, pp. 180-183, XP008023810, ISSN: 0020-0190.

Pourbigharaz F. et al, Modulo-Free Architecture for Binary to Residue Transformation with Respect to (2m-1, 2m, 2m+1) Moduli Set, IEEE International Symposium on Circuits and Systems, May 30-Jun. 2, 1994, pp. 317-320, vol. 2, London, UK.

Salberg, et al, "Stochastic multipulse-PAM: A subspace modulation technique with diversity" Signal Processing, Elsevier Science Publishers B.V. Amsterdam, NL, vol. 83, No. 12, Dec. 1, 2003, pp. 2559-2577, XP004467986; ISSN: 0165-1684.

Vanwiggeren et al., "Chaotic Communication Using Time-Delayed Optical Systems", International Journal of Bifurcation and Chaos, vol. 9, No. 11 (1999), pp. 2129-2156, World Scientific Publishing Company.

Weisstein, Eric W., "Injection," From MathWorld—A Wolfram Web Resource. http://mathworld.wolfram.com/Injection.html.

Weisstein, Eric W. "Surjection," From MathWorld—A Wolfram Web Resource, http://mathworld.wolfram.com/Surjection.html.

Yen, et al., (1999) "Residual No. System Assisted CDMA: A New System Concept", in: ACTA'99, Jun. 8-11, 1999, Sorrento, Italy.

Yu, et al., "A comparative Study of Different Chaos Based Spread Spectrum Communication Systems", ISCAS 2001, Proceedings of the 2001 IEEE International Symposium on Circuits and Systems, Sydney, Australia, May 6-9, 2001; (IEEE International Symposium on Circuits and Systems], New York, NY : IEEE, US, vol. 3, May 6, 2001, pp. 216-216, XP01054114, ISBN: 978-0-7803-6685-5.

Michaels, et al., U.S. Appl. No. 12/496,214, filed Jul. 1, 2009, entitled "Anti-Jam Communications Having Selectively Variable PAPR Including Cazac Waveform".

Michaels, et al., U.S. Appl. No. 12/507,111, filed Jul. 22, 2009, entitled "Anti-Jam Communications Using Adaptive Chaotic Spread Waveform".

Chester, et al., U.S. Appl. No. 12/480,264, filed Jun. 8, 2009, entitled "Continuous Time Chaos Dithering".

Chester, et al., U.S. Appl. No. 12/481,704, filed Jun. 10, 2009, entitled "Discrete Time Chaos Dithering".

Michaels, et al., U.S. Appl. No. 12/345,163, filed Dec. 29, 2008, entitled "Communications System Employing Chaotic Spreading Codes With Static Offsets".

Micheals, et al., U.S. Appl. No. 12/344,962, filed Dec. 29, 2008, entitled "Communications System Employing Orthogonal Chaotic Spreading Codes".

Michaels, et al., U.S. Appl. No. 12/396,828, filed Jun. 3, 2009, entitled "Communications System Employing Orthogonal Chaotic Spreading Codes".

Michaels, et al., U.S. Appl. No. 12/496,170, filed Jul. 1, 2009, entitled "Permission Based Multiple Access Communications Systems".

Michaels, et al., U.S. Appl. No. 12/496,233, filed Jul. 1, 2009, entitled "Permission-Based Secure Multiple Access Communication Systems Rotations".

Michaels, et al., U.S. Appl. No. 12/507,512, filed Jul. 22, 2009, entitled "Permission-Based TDMA Chaotic Communication Systems".

Micheals, et al., U.S. Appl. No. 12/496,085, filed Jul. 1, 2009, entitled, "High-Speed Cryptographic System Using Chaotic Sequences".

Michaels, et al., U.S. Appl. No. 12/496,123, filed Jul. 1, 2009, entitled, "Rake Receiver for Spread Spectrum Chaotic Communications Systems".

Michaels, et al., U.S. Appl. No. 12/496,146, filed Jul. 1, 2009, entitled "Improved Symbol Estimation for Chaotic Spread Spectrum Signal".

Micheals, et al., U.S. Appl. No. 12/480,316, filed Jun. 8, 2009, entitled "Symbol Duration Dithering for Secured Chaotic Communications".

Michaels, et al., U.S. Appl. No. 12/496,183, filed Jul. 1, 2009, entitled "Bit Error Rate Reduction in Chaotic Communications".

Michaels, Alan, U.S. Appl. No. 12/248,131, filed Oct. 9, 2008, entitled "Ad-Hoc Network Acquisition Using Chaotic Sequence Spread Waveform".

Michaels, Alan, U.S. Appl. No. 12/201,021, filed Aug. 29, 2008, entitled, "Multi-Tier Ad-Hoc Network Communications".

Aparicio; "Communications Systems Based on Chaos" May 2007. Universidad Rey Juan Carlos.

Bererber, S.M., et al., "Design of a CDMA Sysetm in FPGA Technology", Vehicular Technology Conference, 2007. VTC2007-Spring. IEEE 65$^{th}$ Apr. 22, 2007, Apr. 25, 2007, pp. 3061-3065, XP002575053 Dublin ISBN: 1-4244-0266-2 Retrieved from the Internet: URL:http://ieeexplore.ieee.org> [retrieved on Mar. 23, 2010].

Desoky, A.H., et al., "Cryptography Software System Using Galois Field Arithmetic" 2006 IEEE Information Assurance Workshop, West Point, NY, Jun. 12-13, Piscataway, NJ, USA IEEE, Jan. 1, 2006, pp. 386-387, XP031099891.

El-Khamy S E: "New trends in wireless multimedia communications based on chaos and fractals" National Radio Science Conference, 2004. NRSC 2004. Proceedings of the Twenty-First Cairo, Egypt March 16-18, 2004, Piscataway, NJ, USA, IEEE, pp. _1-1_1, XP010715117 ISBN: 978-977-5031-77-8.

Lai, X., et al., "A Proposal for a New Block Encryption Standard" Advances in Cryptology—Eurocrypt '90, Workshop on the Theory and Application of Cryptographic Techniques Proceedings, Springer-Verlag Berlin, Germany, 1998, pp. 389-404, XP000617517.

Soobul, Y., et al. "Digital chaotic coding and modulation in CDMA" IEEE AFRICON 2002 Oct. 2, 2002,Oct. 4, 2002, pp. 841-846, XP002575052 Retrieved from the Internet: URL:http://ieeexplore.ieee.org> [retrieved on Mar. 23, 2010].

Rabiner, Lawrence R., "A Tutorial on Hidden Markov Models and Selected Applications in Speech Recognition", Proceedings of the IEEE, vol. 77, No. 2, Feb. 1989.

Boyar, "Inferring Sequences Produce by Pseudo-Random No. Generators", Journal of the Associate for Computing Machine, vol. 36, No. 1, pp. 20-41, 1989.

Barile, M., "Bijective", From MathWorld—A Wolfram Web Resource, created by Eric W. Weisstein, [online] [retrieved on Nov. 8, 2010] Retrieved from the Internet: <http://mathworld.wolfram.com/Bijective.html>.

Weisstein, E., Surejection:, From MathWorld—AWolfram Web Resource [online] [retrieved on Nov. 8, 2010] Retrieved from the Internet: <http://mathworld.wolfram.com/surjection.html>.

Weisstein, E., Surejection:, From MathWorld—AWolfram Web Resource [online] [retrieved on Nov. 8, 2010] Retrieved from the Internet: http://mathworld.wolfram.com/injection.html>.

Harris Corp., International Search Report mailed Feb. 11, 2010, Application Serial No. PCT/US2009/059948.

Harris Corp., International Search Report mailed Apr. 13, 2010, Application Serial No. PCT/US2009/0069121.

Harris Corp., International Search Report mailed Apr. 13, 2010, Application Serial No. PCT/US2009/0069118.

Harris Corp., European Search Report mailed Mar. 4, 2010, Patent Application No. 08009745.4.

Barda, A; et al., "Chaotic signals for multiple access communications," Electrical and Electronics Engineers in Israel, 1995, Eighteenth Convention of, vol., No., pp. 2.1.3/1-2.1/3/5, Mar. 7-8, 1995.

Alia, G., et al., "A VLSI Algorithm for Direct and Reverse Conversion from Weighted Binary Number System to Residue Number System", IEEE Trans on Circuits and Systems, vol. Cas-31, No. 12, Dec. 1984.

Menezes, Vanstone, Oorschot: "Handbook of Applied Cryptography", 1997, CRC Press LLC, USA, XP002636791, p. 80-p. 85, p. 238-242.

Schneier, Bruce: "Applied Cryptography Second Edition", 1997, John Wiley & Sons, USA, XP002636792, p. 254-p. 255.

Information about Related Patent and Patent Applications, see section 6 of the accompanying Information Disclosure Statement Letter, which concerns Related Patents and Patent Applications.

Taylor, F.J., "Residue Arithmetic a Tutorial with Examples", Computer, vol. 17, No. 5, pp. 50-62, May 1984, doi: 10.1109/MC.1984.1659138.

Chester, D., Office Action mailed Apr. 6, 2011; U.S. Appl. No. 12/026,217; entitled "Cryptographic System Incorporating a Digitally Generated Chaotic Numerical Sequence"; filed Feb. 5, 2008.

* cited by examiner

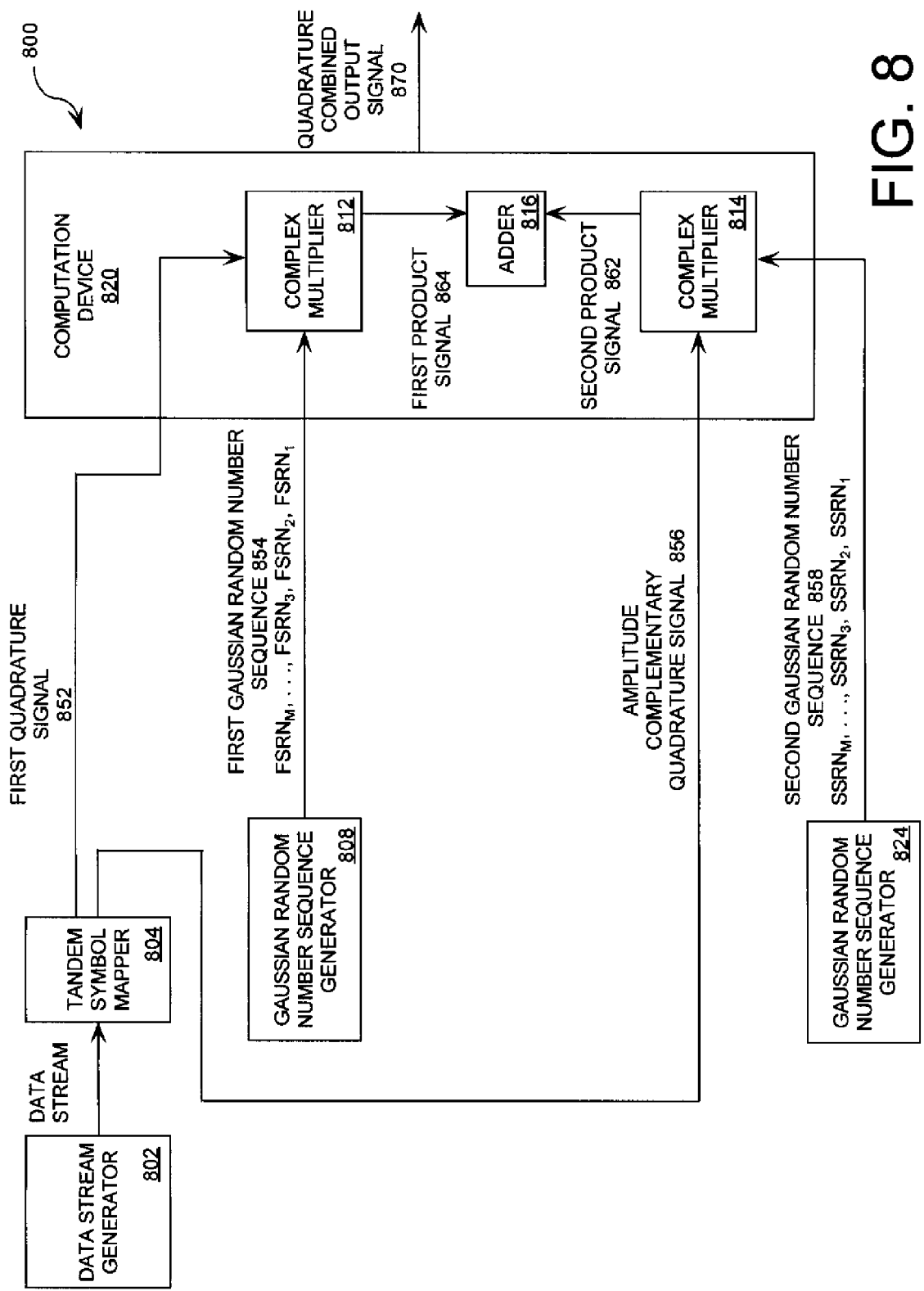

FEATURELESS COHERENT CHAOTIC AMPLITUDE MODULATION

BACKGROUND OF THE INVENTION

1. Statement of the Technical Field

The invention concerns communications systems. More particularly, the invention relates to a method for reducing exploitable features existing in secure amplitude modulated waveforms.

2. Description of the Related Art

Direct sequence spread spectrum communications signals are commonly generated by combining a data signal with a "noise" signal. The noise signal is typically a pseudorandom sequence of values which are generated at a much higher rate as compared to the data signal. The data signal can be reconstructed at a receiver by using the same pseudorandom sequence in a despreading process. Such spread spectrum communications signals are advantageous for many communications applications including secure systems and spectrum efficient systems.

Conventional spread spectrum communications signals have some limitations. For example, if statistical, higher order, and cyclostationary features of the signal are measured, then signal parameters can be derived. The signal parameters can include the pseudorandom sequences that are used to generate a spread spectrum signal. The measured statistical, higher order, and cyclostationary features can also be used to generate metadata (e.g., symbol rates and modulation type) describing a transmitted signal. This ability to generate metadata can compromise the security of the data which is being transmitted.

The foregoing problem can potentially be avoided by using a chaotic spreading sequence with no detectable signal features. The signal features include, but are not limited to, inter-symbol variations in expected power, intra-symbol power variations, and chipping rates which can be found in conventional pseudorandom sequences. If the chaotic spreading sequence is properly implemented, then the chaotic sequence would be free of signal artifacts with the exception of signal power.

However, such a chaotic spreading sequence approach would not resolve a second problem of conventional spread spectrum communications. The second problem relates to unwanted detection when a transmitted waveform power envelope changes from one symbol to another, as would occur in any analog or digital amplitude modulated waveform. Amplitude modulated waveforms (e.g., pulse amplitude modulation, quadrature amplitude modulation, and amplitude and amplitude phase shift keying) are often used to increase data throughput via varying symbol amplitude levels.

Unwanted detection of a spread spectrum waveform can occur due to the presence of detectable cyclostationary features in the signal. If a truly chaotic signal were used in place of the conventional pseudorandom sequence, then a waveform with a stationary power envelope may be generated using a phase shift keying (PSK) modulation method. In such a scenario, a statistically featureless waveform may be produced. Such a signal can have an analytical appearance of additive white Gaussian noise, with ideally zero skewness and excess kurtosis values. As such, there does not exist any practically detectable cyclostationary features in the signal.

However, those skilled in the art will appreciate that if the modulation scheme is restricted to PSK then data throughput may be limited. Alternative modulation schemes (such as Quadrature Amplitude Modulation) can be used to increase data throughput. However, the amplitude modulation component which is essential to such modulation schemes will induce detectable cyclostationary features in the spread waveform.

SUMMARY OF THE INVENTION

This Summary is provided to comply with 37 C.F.R. § 1.73, which states that a summary of the invention briefly indicating the nature and substance of the invention should precede the detailed description. However, this Summary is not intended to limit the scope or meaning of the claims.

The present invention concerns systems and methods for generating a chaotic amplitude modulated signal absent of cyclostationary features by preserving a constant variance. The methods involve generating a PAM signal including pulse amplitude modulation having a periodically changing amplitude. The methods also involve: generating a first part of a constant power envelope signal (FPCPES) by dividing the PAM signal by a square root of a magnitude of the PAM signal; and generating a second part of the constant power envelope signal (SPCPES) having a magnitude equal to a square root of one minus the magnitude of the PAM signal. The methods further involve generating first and second spreading sequences. Each of the spreading sequences is formed as a sequence of random values. The spreading sequences have no significant correlations.

According to an aspect of the invention, the FPCPES is combined with the first spreading sequence to generate a first product signal. Similarly, the SPCPES is combined with the second spreading sequence to generate a second product signal. A constant power envelope signal is generated using the first and second product signals.

According to another aspect of the invention, each of the first and second spreading sequences is an orthogonal chaotic sequence. The PAM signal is generated using discrete time baseband modulation to form AM symbols. The discrete time baseband modulation can be, but is not limited to, quadrature amplitude modulation (QAM). In such a scenario, each of the AM symbols is encoded as an in-phase component "I" and a quadrature component "Q".

According to yet another aspect of the invention, the constant power envelope signal is transmitted over a communication link to a receiver. The receiver can generate a third spreading sequence which is identical to the first spreading sequence. The constant power envelope signal is correlated with the third spreading sequence to recover the PAM signal. The receiver can also generate a fourth spreading sequence which is identical to the second spreading sequence. The constant power envelope signal is correlated with the fourth spreading sequence to recover the SPCPES.

BRIEF DESCRIPTION OF THE DRAWINGS

Embodiments will be described with reference to the following drawing figures, in which like numerals represent like items throughout the figures, and in which:

FIG. 8 is a block diagram of an embodiment of a constant variance, tandem arbitrary data phase single complementary signal quadrature amplitude modulation system.

DETAILED DESCRIPTION OF THE PREFERRED EMBODIMENTS

The invention will now be described more fully hereinafter with reference to accompanying drawings, in which illustrative embodiments of the invention are shown. This invention may, however, be embodied in many different forms and should not be construed as limited to the embodiments set forth herein. For example, the present invention can be embodied as a method, a data processing system or a computer program product. Accordingly, the present invention can take the form as an entirely hardware embodiment, an entirely software embodiment or a hardware/software embodiment.

Figure 1A:
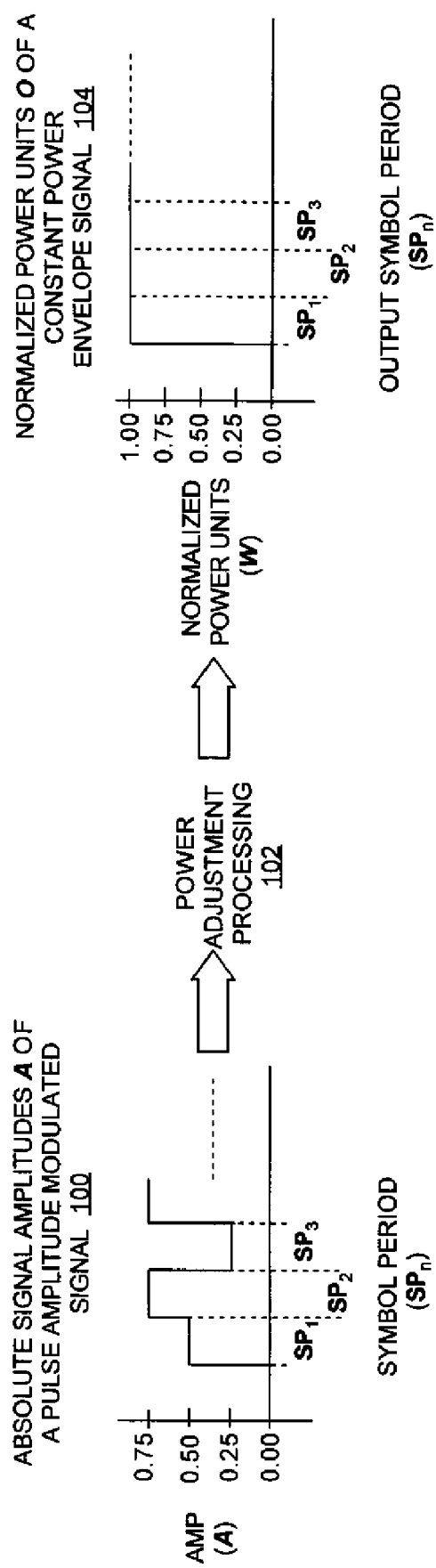
FIG. 1A is a conceptual diagram of a method for removing cyclostationary and statistical artifacts from a pulse amplitude modulated (PAM) signal that is useful for understanding the present invention.

Referring now to FIG. 1A, there is provided a conceptual diagram of a method for removing statistical artifacts from a pulse amplitude modulated (PAM) signal 100 that assumes seperability of the signal and its complement. PAM signals 100 are well known to those having ordinary skill in the art, and therefore will not be described in detail herein. However, it should be understood that the PAM signal 100 can be generated in accordance with any known discrete time amplitude modulation scheme. Such discrete time amplitude modulation schemes include, but are not limited to, amplitude-shift keying (ASK), quadrature amplitude modulation (QAM), and amplitude and phase-shift keying (APSK).

As shown in FIG. 1A, the PAM signal 100 has cyclostationary signal properties resulting from its periodically changing power. In effect, an outside observer can detect the PAM signal 100 simply by identifying the periodic nature of the PAM signal's 100 symbol energy. Consequently, it is desirable to process the PAM signal 100 to reduce or eliminate the cyclostationary properties from the PAM signal 100. Stated differently, it is desirable to perform power adjustment processing (PAP) 102 for generating a constant power envelope signal 104. The phrase "constant power envelope signal" as used herein refers to a signal having a power or variance that does not change periodically in statistical expectation over time. Such PAP 102 will now be described in relation to FIGS. 1B-2.

Figure 1B:
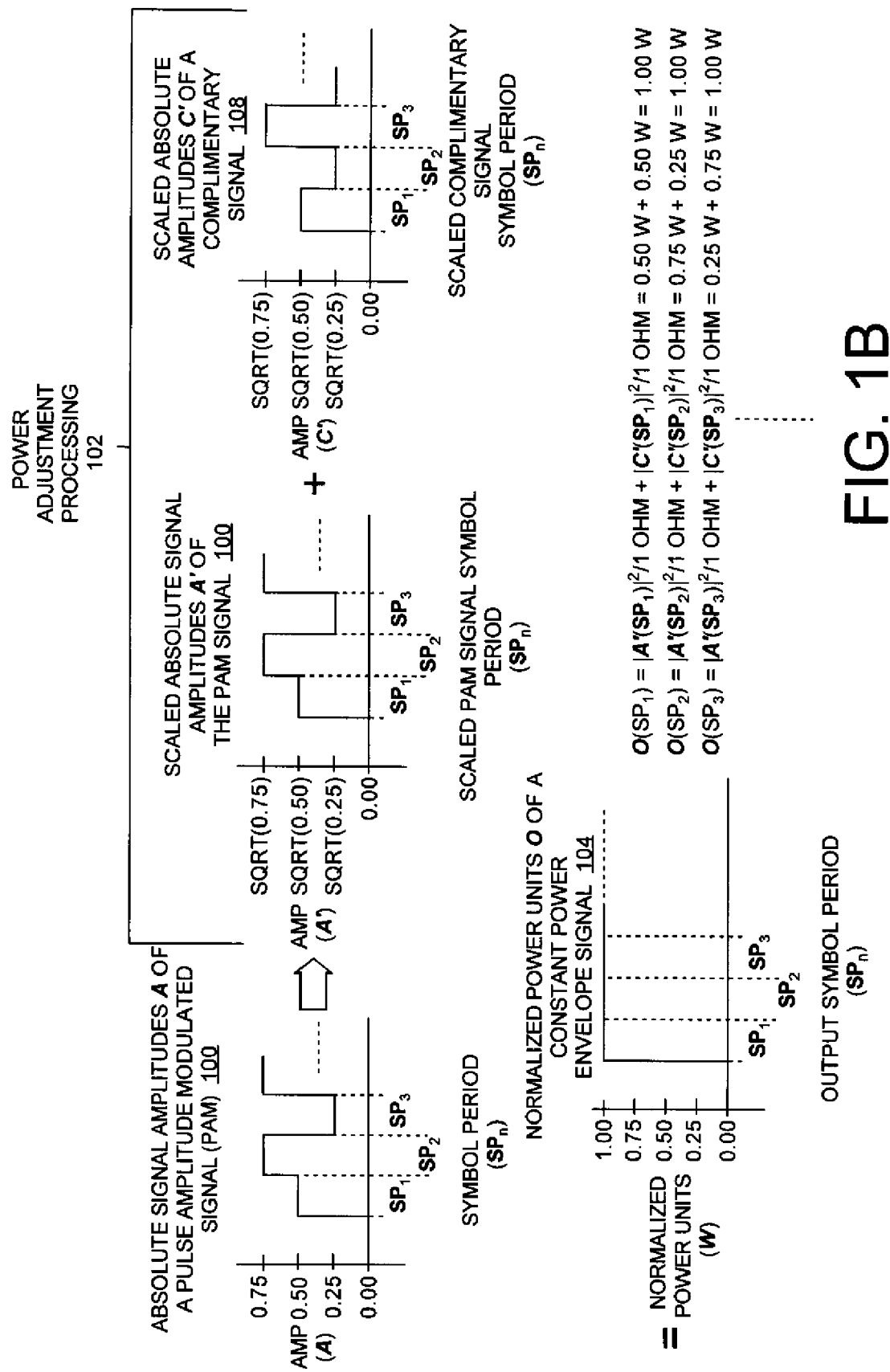
FIG. 1B is a schematic illustration of an amplitude adjustment processing that is useful for understanding the present invention.

Referring now to FIG. 1B, there is provided a conceptual illustration of a PAP 102 that is useful for understanding the present invention. It should be understood that the variance of a chaotic signal is a function of the square of a signal's amplitude measured in volts. As shown in FIG. 1B, the PAP 102 generally involves performing addition operations to combine the amplitudes A of the PAM signal 100 for each symbol period SP with the amplitudes C of a complementary signal 108 such that the sum of the squares of the amplitudes A and C remain constant. For convenience, the amplitude A of the PAM signal 100 for each symbol period SP shall be referred to herein as $A(SP_n)$, where n is the index number of a particular symbol period SP. Thus, the amplitude A of the PAM signal 100 for the first symbol period $SP_1$ is $A(SP_1)$. Similarly, the amplitude A of the PAM signal 100 for the second index period $SP_2$ is $A(SP_2)$, and so on. The amplitude C of the complementary signal 108 for each symbol period SP shall be referred to herein as $C(SP_n)$, where n is the index number of a particular symbol period SP. The amplitude C of the complementary signal 106 for the first symbol period $SP_1$ is $C(SP_1)$. Likewise, the amplitude C of the complementary signal for the second index period $SP_2$ is $C(SP_2)$, and so on.

Such addition operations can be defined by the following mathematical equations (1)-(3).

$$O(SP_1) = |A(SP_1)|^2/1\Omega + |C(SP_1)|^2/1\Omega \quad (1)$$

$$O(SP_2) = |A(SP_2)|^2/1\Omega + |C(SP_2)|^2/1\Omega \quad (2)$$

$$O(SP_3) = |A(SP_3)|^2/1\Omega + |C(SP_3)|^2/1\Omega \quad (3)$$

where $O(SP_1)$ is a power of the constant power envelope signal 104 for a first output symbol period. $O(SP_2)$ is a power of the constant power envelope signal 104 for a second output symbol period. $O(SP_3)$ is a power of the constant power envelope signal 104 for a third output symbol period. $A(SP_1)$ is an amplitude of the PAM signal 100 for a first symbol period. $A(SP_2)$ is an amplitude of the PAM signal 100 for a second first symbol period. $A(SP_3)$ is an amplitude of the PAM signal 100 for a third symbol period. $C(SP_1)$ is an amplitude of the complementary signal 106 for a first symbol period. $C(SP_2)$ is an amplitude of the complementary signal 106 for a second symbol period. $C(SP_3)$ is an amplitude of the complementary signal 106 for a third symbol period.

Referring again to FIG. 1B, the PAP 102 produces the constant power envelope signal 104. However, the PAP 102 does not produce a separable signal combination. The phrase "separable signal" as used herein refers to a signal having separable signal components, wherein a first signal component is orthogonal to all other signal components. One can appreciate that this non-separable signal combination is undesirable in a communications system application since there is no distinction, and therefore no useable information, between the first and second PAM signals 100. As such, the PAP 102 needs improvement so that the combination of the PAM signal 100 and the complementary signal 108 is a separable signal combination. Such an improved PAP 102 will now be described in relation to FIGS. 1C and 2.

Figure 1C:
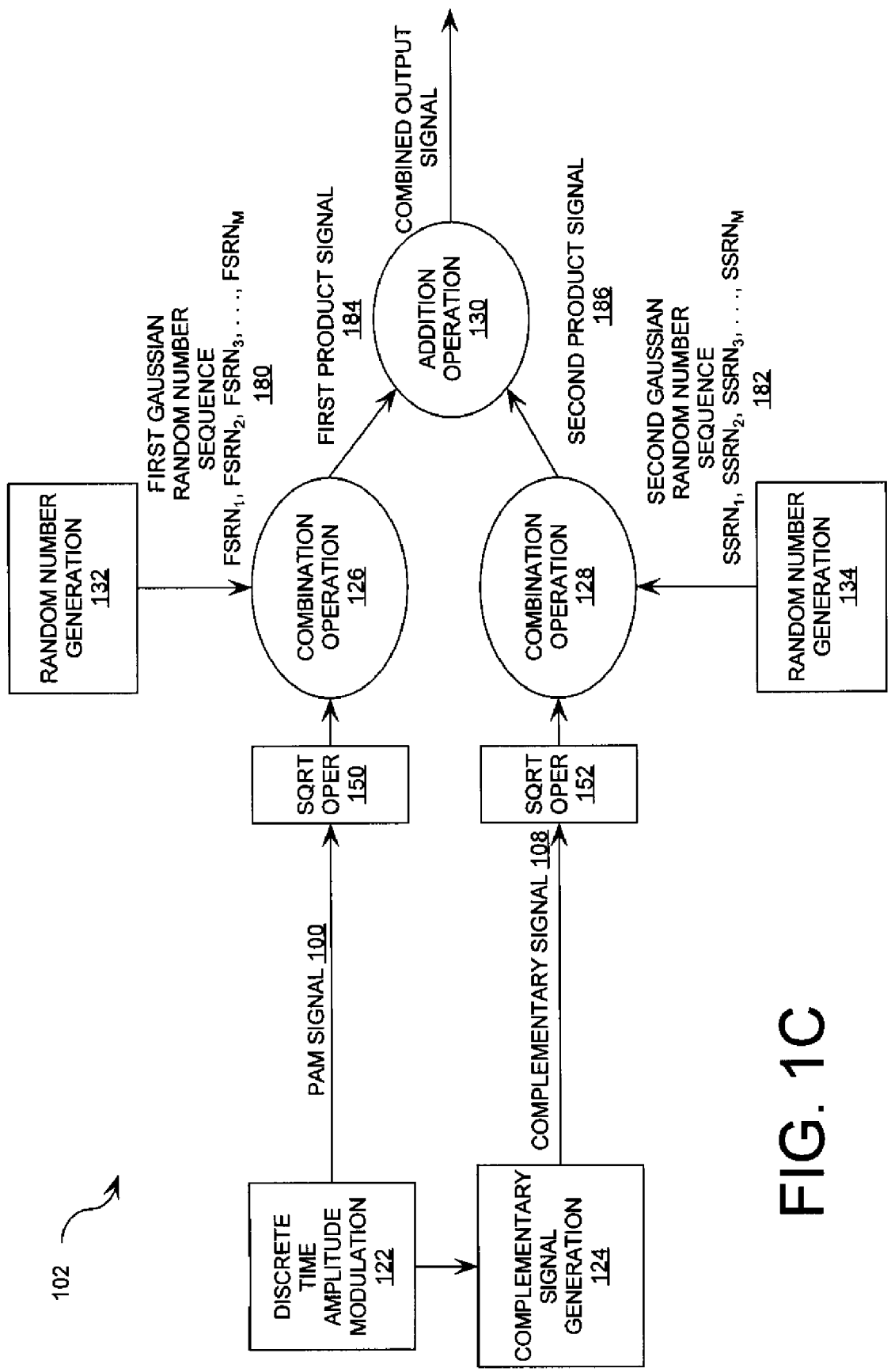
FIG. 1C is a schematic illustration of an improved amplitude adjustment process that is useful for understanding the present invention.

Referring now to FIG. 1C, the improved PAP 102 generally involves performing combination (or multiplication) operations 126, 128 utilizing orthogonal signals (e.g., 180, 182) and an addition operation 130. As used herein, the term orthogonal signal may be applied to signals or discrete sequences, to indicate that the stationary statistical expectation of two or more signals is zero (0). One typical example of orthogonal signals in practical use are the sine and cosine functions. In communications systems employing chaotic spreading sequences, the orthogonal signals can be expressed as independent Gaussian random number sequences. For example, a first Gaussian random number sequence 180 can be generated using a random number generation operation 132. The first Gaussian random number sequence 180 can be defined as the sequence of random numbers $FSRN_1$, $FSRN_2$, $FSRN_3$, ..., $FSRN_M$. A second Gaussian random number sequence 182 can be generated using a random number generation operation 134. The second Gaussian random number sequence 182 can be defined as the second sequence of random numbers $SSRN_1$, $SSRN_2$, $SSRN_3$, ..., $SSRN_M$. In such a scenario, the Gaussian random number sequences 180, 182 can be generated utilizing two (2) statistically independent Gaussian random number generators, Gaussian pseudo-random number generators, or Gaussian chaotic number generators. Such random number generators are well known to those having ordinary skill in the art, and therefore will not be described herein. However, it should be appreciated that any known random number generator or circuit can be used without limitation.

If the Gaussian random number sequences 180, 182 are generated using Gaussian-distributed chaotic number generators, then the random number sequences 180, 182 are chaotic number sequences. It should be understood that a mathematically chaotic signal based on a chaotic number sequence can be made to present itself as a noise signal having a Gaussian distribution. The Gaussian distribution is well known to those having ordinary skill in the art, and therefore will not be described in detail herein. However, it should be appreciated that the power of the chaotic signal is measured as the variance of the Gaussian noise distribution. It is desirable to have the variance of the sum of the products of the combination (or multiplication) operations 126, 128 to equal a constant variance (or power) in statistical expectation. This constant variance need not be obtained from two (2) equal variance signals. Although, both random number generators 132, 134 can be selected to have standard normal (Gaussian) distributions with zero (0) mean and unit variance.

In order to obtain the desired constant variance from the summed signal, the combination operations 126, 128 require that the amplitude modulated symbol amplitudes be combined in 2-space. The phrase "2-space" as used herein refers to the mathematical structure based on two (2) orthogonal basis functions. A definition of an amplitude (or, more properly, magnitude or norm) for a signal X with two (2) distinct (orthogonal) components X1 and X2 in "2-space" is reflected in the following mathematical equation (4).

$$\|X\|^2 = |X1|^2 + |X2|^2 \qquad (4)$$

where $X=X1+X2$ and $|X1|$ represents the absolute value of X1. Mathematical equation (4) is a well understood generalization of the Pythagorean Theorem, and therefore will not be described in further detail. However, it should be understood that if a "2-space" application for communications systems is employed then signals must be combined on a power basis (rather than on a voltage basis) to maintain a constant power (variance) output signal.

Such combination (or multiplication) operations 126, 128 can be defined by mathematical equations (5) and (6).

$$FPS = PAMS \cdot FOS = [sqrt[A(SP_1)] \cdot FSRN_1], [sqrt[A(SP_1)] \cdot FSRN_2], [sqrt[A(SP_1)] \cdot FSRN_3], \ldots, [sqrt[A(SP_1)] \cdot FSRN_{M/N}], [A(SP_2)] \cdot FSRN_{M/N+1}], [A(SP_2)] \cdot FSRN_{M/N+2}], \ldots, [A(SP_2)] \cdot FSRN_{2M/N}], [A(SP_3)] \cdot FSRN_{2M/N+1}], \ldots \qquad (5)$$

$$SPS = CS \cdot SOS = [sqrt[C(SP_1)] \cdot SSRN_1], [sqrt[C(SP_1)] \cdot SSRN_2], [sqrt[C(SP_1)] \cdot SSRN_3], \ldots, [sqrt[C(SP_1)] \cdot SSRN_{M/N}], [sqrt[C(SP_2)] \cdot SSRN_{M/N+1}], [sqrt[C(SP_2)] \cdot SSRN_{M/N+2}], \ldots, [sqrt[C(SP_2)] \cdot SSRN_{2M/N}], [sqrt[C(SP_3)] \cdot SSRN_{2M/N+1}], \ldots \qquad (6)$$

where FPS is a first product signal 184 resulting from the multiplication of the square root of the PAM signal 100 and a first orthogonal signal 180. SPS is a second product signal 186 resulting from the multiplication of the square root of the complementary signal 106 and a second orthogonal signal 182. PAMS is the PAM signal 100. CS is the complementary signal 108. FOS is the first orthogonal signal 180. SOS is the second orthogonal signal 182.

The addition operation 130 can be defined by the following mathematical equation (7).

$$COS = FPS + SPS = [(sqrt[A(SP_1)] \cdot FSRN_1) + (sqrt[C(SP_1)] \cdot SSRN_1)], \ldots, [(sqrt[A(SP_2)] \cdot FSRN_{L+1}) + (sqrt[C(SP_2)] \cdot SSRN_{L+1})], \ldots \qquad (7)$$

where the combined output signal (COS) is a signal combination including the signal FPS resulting from a first multiplication operation defined above in relation to mathematical equation (5) and a signal SPS resulting from a first multiplication operation defined above in relation to mathematical equation (6).

Figure 2:
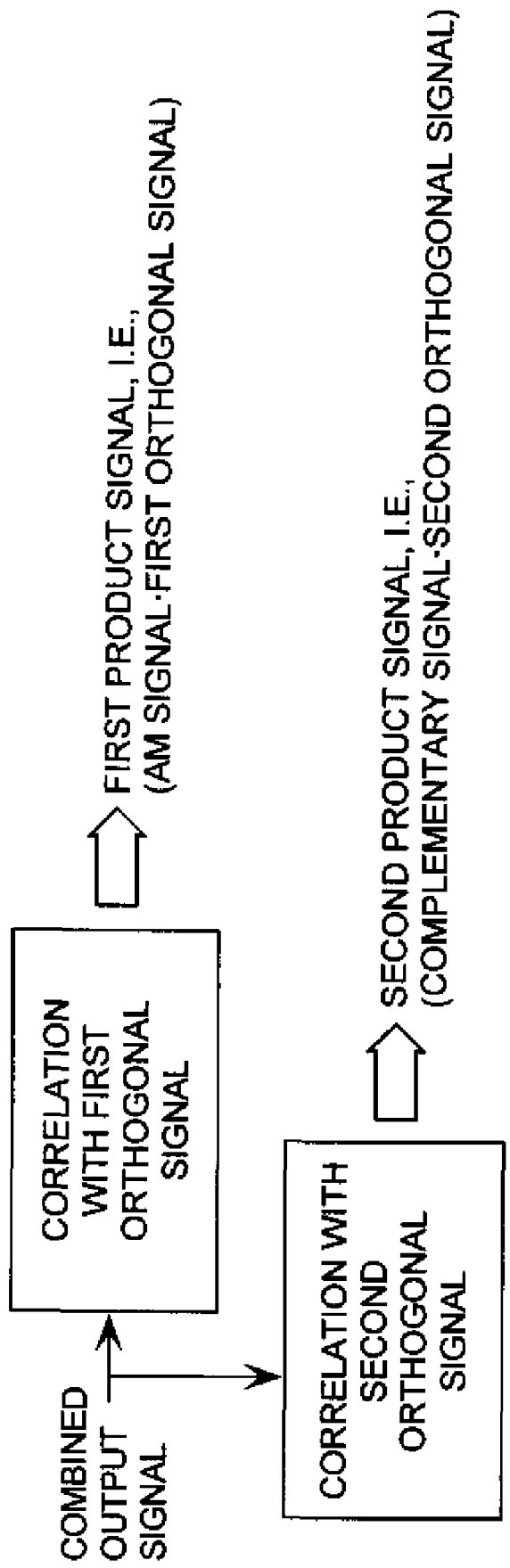
FIG. 2 is a schematic illustration of a signal separation that is useful for understanding the present invention.

Notably, the COS is a separable signal. Stated differently, the COS is comprised of separable components, namely the signal FPS and the signal SPS. The signal components FPS and SPS can be separated utilizing correlation operations as shown in FIG. 2. Such correlation operations are well known to those having ordinary skill in the art, and therefore will not be described in herein. However, it should be understood that any suitable correlation operation can be used without limitation.

Figure 3:
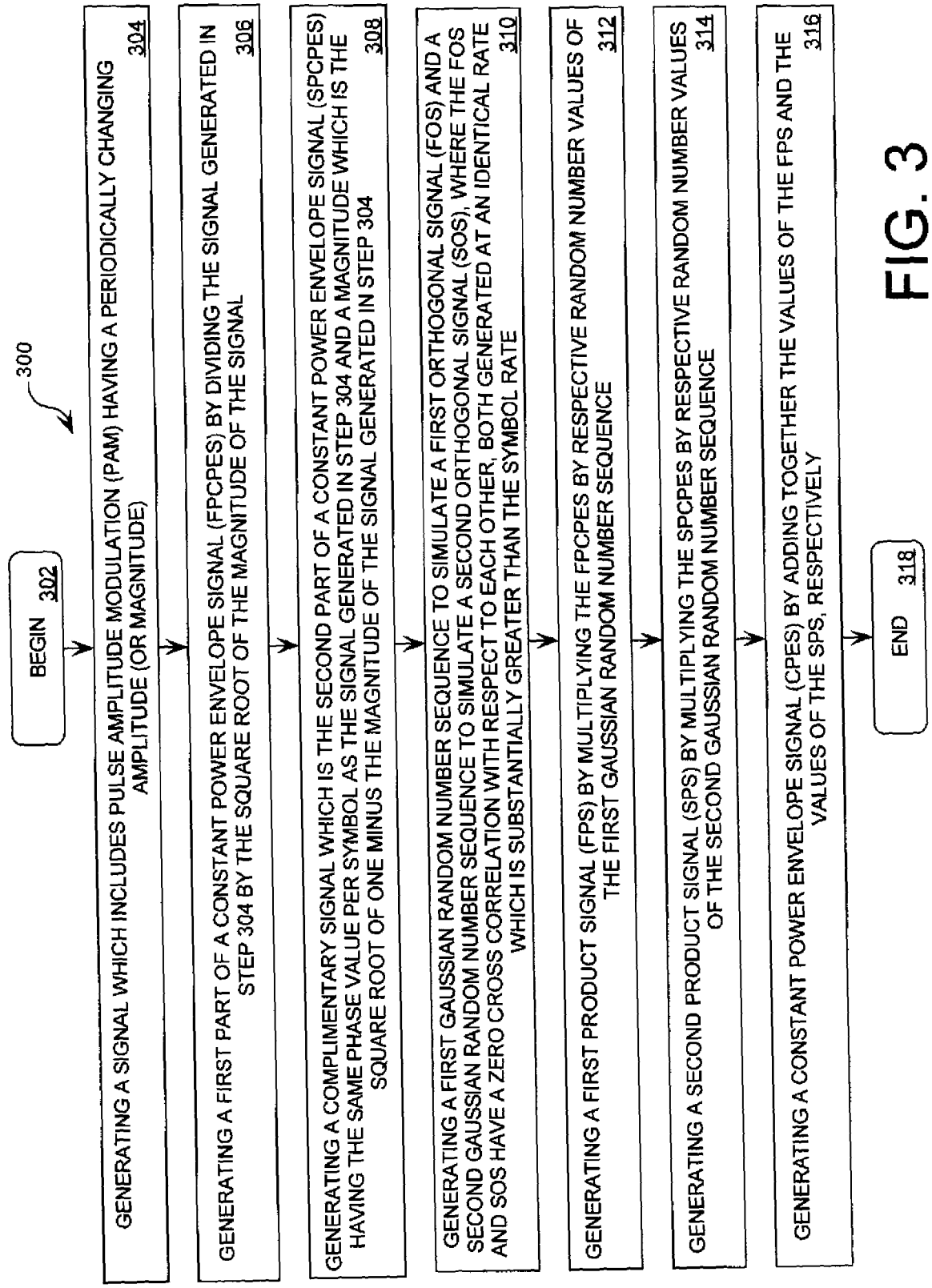
FIG. 3 is a flow diagram of a method for generating a chaotic amplitude modulated signal absent of statistical artifacts and having separable signal components.

Referring now to FIG. 3, there is a method 300 for generating a chaotic amplitude modulated signal absent of cyclostationary features and having separable signal components. As shown in FIG. 3, the method 300 begins at step 302 and continues with step 304. In step 304, a signal 100 is generated. The signal 100 has a pulse amplitude modulated (PAM) component. As stated above, the PAM signal 100 has a periodically changing amplitude (or magnitude). The PAM signal 100 can be generated in accordance with any known discrete time amplitude modulation scheme.

Thereafter, the method continues with step 306. In step 306, a first part of a constant power envelope signal (FPCPES) is generated by dividing the PAM signal 100 by the square root of the magnitude values $A(SP_1)$, $A(SP_2)$, $A(SP_3)$, ..., $A(SP_N)$ of the PAM signal 100. In step 308, a complementary signal 108 is generated. The complimentary signal 108 is the second part of a constant power envelope signal (SPCPES). The complementary signal 108 is a signal with the same phase as the PAM signal 100. The complementary signal 108 has a magnitude that is the square root of one minus the magnitude of the PAM signal 100. In such a scenario, the complementary signal 108 has magnitude values defined by the following mathematical equations (8)-(10).

$$C(SP_1) = sqrt(1 - A(SP_1)) \qquad (8)$$

$$C(SP_2) = sqrt(1 - A(SP_2)) \qquad (9)$$

...

$$C(SP_N) = sqrt(1 - A(SP_N)) \qquad (10)$$

where $C(SP_1)$ is a first magnitude value of the complementary signal 108. $C(SP_2)$ is a second magnitude value of the complementary signal 108. $C(SP_N)$ is an $N^{th}$ magnitude value of the complementary signal 108. Still, the invention is not limited in this regard.

Upon completing step 308, the method 300 continues with step 310. In step 310, a first Gaussian random number sequence (FGRNS) is generated that behaves like a first orthogonal signal (FOS). The FGRNS is comprised of the random number sequence $FSRN_1$, $FSRN_2$, $FSRN_3$, ..., $FSRN_M$. The random number sequence $FSRN_1$, $FSRN_2$, FSRN$_3$, ..., FSRN$_M$ can be a true random number sequence, a pseudo-random number sequence, or a chaotic number sequence.

Similarly, a second Gaussian random number sequence (SGRNS) is generated that behaves like a second orthogonal signal (SOS). The SOS is orthogonal to the FOS. The SGRNS is comprised of the random number sequence SSRN$_1$, SSRN$_2$, SSRN$_3$, ..., SSRN$_M$. The random number sequence SSRN$_1$, SSRN$_2$, SSRN$_3$, ..., SSRN$_M$ can be a true random number sequence, a pseudo-random number sequence, or a chaotic number sequence. Notably, the stationary statistical expectation of the first orthogonal signal and the second orthogonal signal is zero (0). Stated differently, the FOS and SOS have a zero (0) cross correlation with respect to each other. The FOS and SOS are generated at an identical rate which is substantially greater than a symbol rate.

After generating the FGRNS and SGRNS, step 312 is performed. In step 312, a first product signal (FPS) is generated by multiplying values of the FPCPES signal by respective random number values of the FGRNS. For example, if the FPCPES signal is comprised of a plurality of amplitude modulated (AM) symbol periods, then a first amplitude sqrt[A(SP$_1$)] of a first AM symbol period is multiplied by a first random number FSRN$_1$ through the L$^{th}$ random number FSRN$_{M/N}$ of the FGRNS, i.e. sqrt[A(SP$_1$)]·FSRN$_1$, sqrt[A(SP$_1$)]·FSRN$_2$, ..., sqrt[A(SP$_1$)]·FSRN$_{M/N}$, where M/N=L is the system's spreading ratio. Similarly, a second amplitude sqrt[A(SP$_2$)] of a second AM symbol period is multiplied by a second sequence of random numbers FSRN$_{M/N+1}$ through FSRN$_{2M/N}$ of the FGRNS, and so on. Still, the invention is not limited in this regard.

In step 314, a second product signal (SPS) is generated by multiplying the values of the SPCPES by respective random number values of the SGRNS. For example, if the SPCPES is comprised of a plurality of complementary symbol periods, then a first amplitude sqrt[C(SP$_1$)] of a first complementary symbol period is multiplied by a first random number SSRN$_1$ through the L$^{th}$ random number SSRN$_{M/N}$ of the SGRNS, i.e., sqrt[C(SP$_1$)]·SSRN$_1$, sqrt[C(SP$_1$)]·SSRN$_2$, ..., sqrt[C(SP$_1$)]·SSRN$_{M/N}$, where M/N=L is the system's spreading ratio. Similarly, a second amplitude sqrt[C(SP$_2$)] of a second complementary symbol period is multiplied by a second random number sequence SSRN$_{M/N+1}$ through SSRN$_{2M/N}$ of the SGRNS, and so on. Still, the invention is not limited in this regard.

After generating the FPS and SPS, the method 300 continues with step 316. In step 316, a constant power envelope signal (CPES) is generated by adding together each of values of the FPS with a respective magnitude value of the SPS. Subsequently, step 318 is performed where the method 300 ends.

Figure 4:
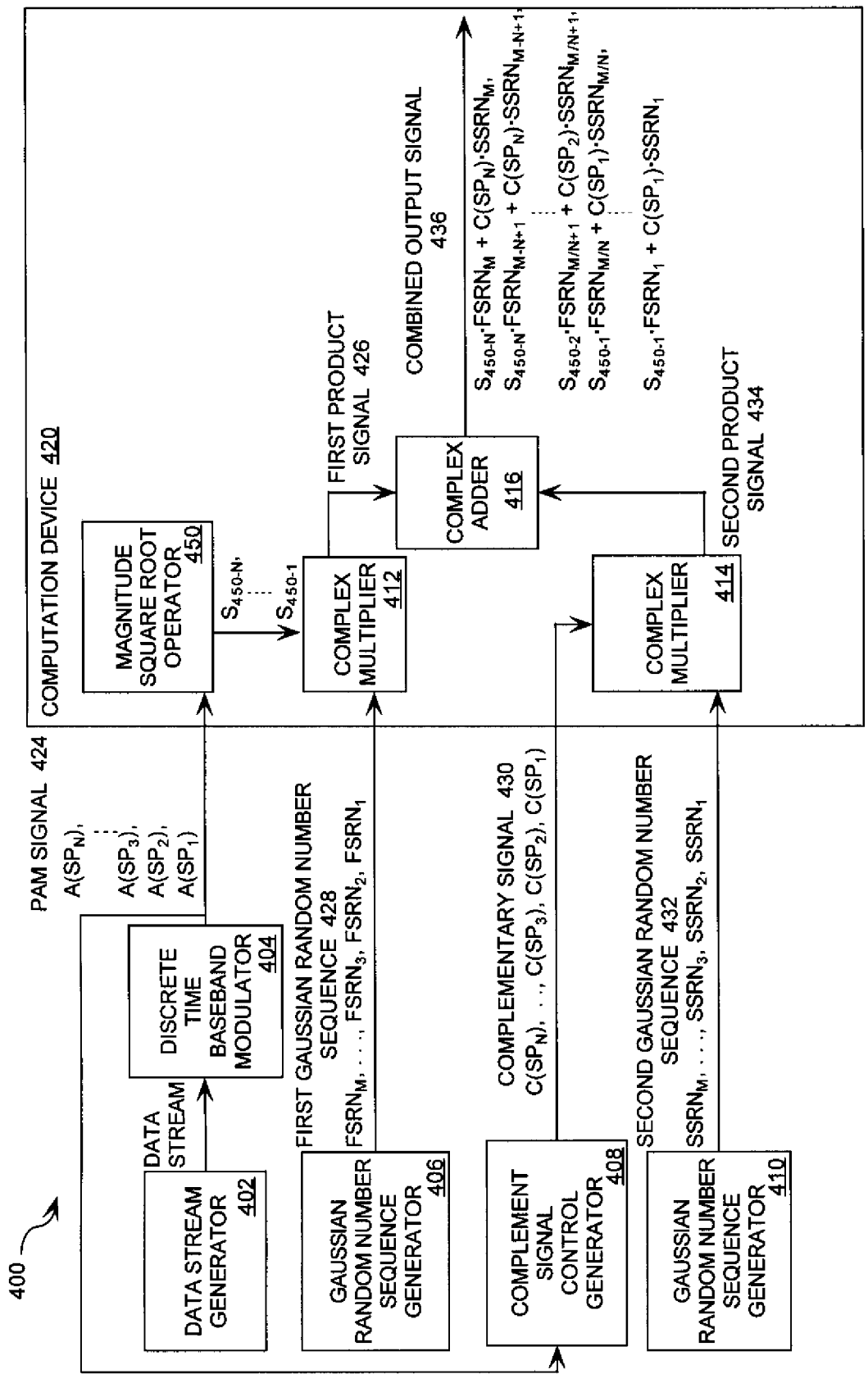
FIG. 4 is a block diagram of a chaotic amplitude modulation system that is useful for understanding the present invention.

Referring now to FIG. 4, there is provided a more detailed block diagram of a chaotic amplitude modulation (CAM) system 400 implementing method 300 (described above in relation to FIG. 3). The CAM system 400 illustrates a generalized application of the inventive concepts to discrete time amplitude modulation. As shown in FIG. 4, the CAM system 400 is comprised of a data stream generator (DSG) 402, a discrete time baseband modulator (DTBM) 404, a complement signal control generator (CSCG) 408, Gaussian random number sequence generators (GRNSGs) 406, 410, and a computation device 420. Each of the listed components 402, 404, 406, 410 is well known to those having ordinary skill in the art, and therefore will not be described in detail herein. However, a brief discussion of the components 402, 404, 406, 410 is provided to assist a reader in understanding the CAM system 400.

Referring again to FIG. 4, the DSG 402 is configured to generate a serial digital data stream. The data stream can include any type of data, such as voice data, video data, text data and the like. The DSG 402 is also configured to communicate the serial digital data stream to the DTBM 404. The DTBM 404 is configured to modulate the serial digital data stream in accordance with any known discrete time amplitude modulation scheme. Such discrete time amplitude modulation schemes include, but are not limited to, amplitude-shift keying (ASK), quadrature amplitude modulation (QAM), and amplitude and phase-shift keying (APSK). The DTBM 404 is also configured to communicate a pulse amplitude modulated signal (PAM signal) 424 to the computation device 420.

The GRNSG 406 is configured to generate a first Gaussian random number sequence (FGRNS) 428 and communicate the same to the computation device 420. Similarly, the GRNSG 410 is configured to generate a second Gaussian random number sequence (SGRNS) 432 and communicate the same to the computation device 420. Likewise, the CSCG 408 is configured to generate a complementary signal 430 and communicate the same to the computation device 420.

The DTBM 404 is configured to generate symbols with a maximum absolute amplitude less than or equal to unity. The CSCG 408 is configured to receive the PAM signal 424 and generate a complementary control data stream using the received PAM signal. The CSCG 408 operates on the amplitude values A(SP$_1$), ..., A(SP$_N$) of the PAM signal 424 to generate complementary symbols. Accordingly, the operations to produce the complementary control data are defined by the mathematical equations (11)-(13).

$$C(SP_1) = (1 - \text{sqrt}|A(SP_1)|) \cdot \text{angle}(SP_1) \quad (11)$$

$$C(SP_2) = (1 - \text{sqrt}|A(SP_2)|) \cdot \text{angle}(SP_2) \quad (12)$$

$$\ldots$$

$$C(SP_N) = (1 - \text{sqrt}|A(SP_N)|) \cdot \text{angle}(SP_N) \quad (13)$$

The computation device 420 is configured to process the received PAM signal 424, FGRNS 428, SGRNS 432, and complementary signal 430. In this regard, it should be understood that the computation device 420 is comprised of a magnitude square root operator (MSRO) 450, complex multipliers 412, 414, and a complex adder 416. Each of the listed components 412, 414, 416 is well known to those having ordinary skill in the art, and therefore will not be described herein. However, a brief discussion of the computation device 420 is provided to assist a reader in understanding the present invention.

Referring again to FIG. 4, the MSRO 450 is configured to determine the square root of the magnitude of each of the amplitudes values A(SP$_1$), ..., A(SP$_N$) of the PAM signal 424. Accordingly, the magnitude square root operations are defined by the following mathematical equations (14)-(16).

$$S_{450-1} = \text{sqrt}[|A(SP_1)|] \quad (14)$$

$$S_{450-2} = \text{sqrt}[|A(SP_2)|] \quad (15)$$

$$\ldots$$

$$S_{450-N} = \text{sqrt}[|A(SP_N)|] \quad (16)$$

where $S_{450-1}$ is a result of a first square root operation performed by the MSRO 450. $S_{450-2}$ is a result of a second square root operation performed by the MSRO 450. $S_{450-N}$ is a result of an N$^{th}$ square root operation performed by the MSRO 450.

The MSRO 450 is further configured to generate the modified PAM values by scaling the amplitude values $A(SP_1)$, $A(SP_2)$, ..., $A(SP_N)$ to produce new values $S(SP_1)$, $S(SP_2)$, ..., $S(SP_N)$ with amplitudes that have magnitudes that are the results $S_{450-1}$, $S_{450-2}$, ..., $S_{450-N}$ of square root operations defined by the following mathematical equations (17)-(19).

$$S_{450-1} = \text{sqrt}|A(SP_1)| \cdot \text{angle}(SP_1) \quad (17)$$

$$S_{450-2} = \text{sqrt}|A(SP_2)| \cdot \text{angle}(SP_2) \quad (18)$$

...

$$S_{450-N} = \text{sqrt}|A(SP_N)| \cdot \text{angle}(SP_N) \quad (19)$$

The MSRO 450 is further configured to communicate the results $S_{450-1}$, $S_{450-2}$, ..., $S_{450-N}$ of the square root operations to the complex multiplier 412.

The complex multiplier 412 is configured to perform multiplication operations using the results $S_{450-1}$, $S_{450-2}$, ..., $S_{450-N}$ of the square root operations and the FGRNS 428. More particularly, the complex multiplier 412 is configured to multiply each of the results $S_{450-1}$, $S_{450-2}$, ..., $S_{450-N}$ by a respective random number $FSRN_1$, ..., $FSRN_M$ of the FGRNS 428. These multiplication operations can be defined by the following mathematical equations (20)-(22).

$$R_{412-1} = S_{450-1} \cdot FSRN_1 = \text{sqrt}|A(SP_1)| \cdot |FSRN_1| \cdot [\text{angle}(A(SP_1)) + \text{angle}(FSRN_1)] \quad (20)$$

...

$$R_{412-N+1} = S_{450-2} \cdot FSRN_{M/N+1} = \text{sqrt}|A(SP_2)| \cdot |FSRN_{M/N+1}| \cdot [\text{angle}(A(SP_2)) + \text{angle}(FSRN_{M/N+1})] \quad (21)$$

...

$$R_{412-M} = S_{450-N} \cdot FSRN_M = \text{sqrt}|A(SP_N)| \cdot |FSRN_M| \cdot [\text{angle}(A(SP_N)) + \text{angle}(FSRN_M)] \quad (22)$$

where $R_{412-1}$ is a result of a first multiplication operation performed by the complex multiplier 412. $R_{412-2}$ is a result of a second multiplication operation performed by the complex multiplier 412. $R_{412-M}$ is result of an $M^{th}$ multiplication operation performed by the complex multiplier 412. The complex multiplier 412 is further configured to communicate a first product signal 426 including the results $R_{412-1}$, $R_{412-2}$, ..., $R_{412-M}$ of the multiplication operations to the complex adder 416.

The complex multiplier 414 is configured to perform multiplication operations using the SGRNS 432 and the results $C(SP_1)$, $C(SP_2)$, ... $C(SP_N)$ of the square root operations performed by the CSCG 408. More particularly, the complex multiplier 414 is configured to multiply each of the results $C(SP_1)$, $C(SP_2)$, ... $C(SP_N)$ by a respective random number $SSRN_1$, ..., $SSRN_N$ of the SGRNS 432. These multiplication operations can be defined by the following mathematical equations (23)-(25).

$$R_{414-1} = C(SP_1) \cdot SSRN_1 \quad (23)$$

...

$$R_{414-M/N} = C(SP_2) \cdot SSRN_{M/N} \quad (24)$$

...

$$R_{414-M} = C(SP_N) \cdot SSRN_M \quad (25)$$

where $R_{414-1}$ is a result of a first multiplication operation performed by the complex multiplier 414. $R_{414-2}$ is a result of a second multiplication operation performed by the complex multiplier 414. $R_{414-M}$ is a result of an $M^{th}$ multiplication operation performed by the complex multiplier 414. The multiplier 414 is further configured to communicate a second product signal 434 including the results $R_{414-1}$, $R_{414-2}$, ..., $R_{414-M}$ of the multiplication operations to the complex adder 416.

The complex adder 416 is configured to generate a combined output signal (COS) 436. More particularly, the complex adder 416 is configured to perform addition operations using the results $R_{412-1}$, $R_{412-2}$, ..., $R_{412-M}$, $R_{414-1}$, $R_{414-2}$, ..., $R_{414-M}$ received from the complex multipliers 412, 414. These addition operations can be defined by the following mathematical equations (26)-(28).

$$\text{Sum}_{416-1} = R_{412-1} + R_{414-1} \quad (26)$$

$$\text{Sum}_{416-2} = R_{412-2} + R_{414-2} \quad (27)$$

...

$$\text{Sum}_{416-M} = R_{412-M} + R_{414-M} \quad (28)$$

where $\text{Sum}_{416-1}$ is a sum of a first addition operation performed by the complex adder 416. $\text{Sum}_{416-2}$ is a sum of a second addition operation performed by the complex adder 416. $\text{Sum}_{416-M}$ is a sum of an $M^{th}$ addition operation performed by the complex adder 416.

The adder 416 is further configured to communicate the COS 436 to an external device (not shown). As should be understood, the external device (not shown) can include radio frequency (RF) hardware. RF hardware is well known to those having ordinary skill in the art, and therefore will not be described in great detail herein. However, it should be understood that the RF hardware performs actions to process the COS 436 for placing the same in a proper form for transmission to a receiving device via a communications link.

Figure 5:
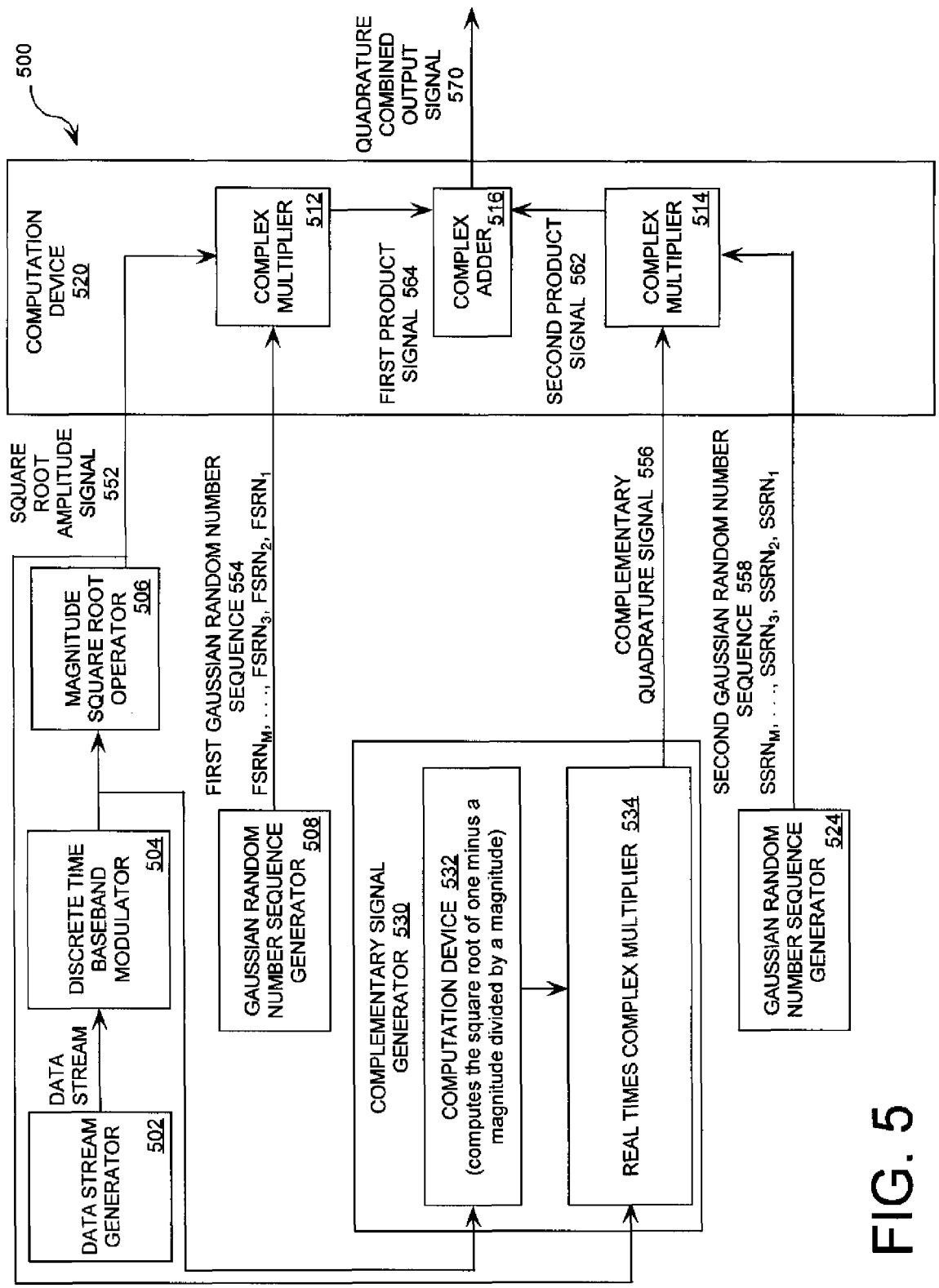
FIG. 5 is a block diagram of a first embodiment of a chaotic quadrature amplitude modulation system that is useful for understanding the present invention.

Referring now to FIG. 5, there is provided a block diagram of an alternative arrangement of the inventive concepts that is useful for understanding the invention. The system 500 of FIG. 5 is similar to the CAM system 400 of FIG. 4. However, the system 500 of FIG. 5 is a chaotic quadrature amplitude modulation (CQAM) system.

As shown in FIG. 5, the CQAM system 500 is comprised of a data stream generator (DSG) 502, a discrete time baseband modulator (DTBM) 504, a magnitude square root operator (MSRO) 506, Gaussian random number sequence generators (GRNSGs) 508, 524, a complementary signal generator (CSG) 530, and a computation device 520. The CSG 530 is comprised of a computation device 532 and a real times complex multiplier (RTCM) 534. The computation device 532 is configured to compute the square root of one minus the magnitude of the symbols divided by the square root of the magnitude of the symbols. The RTCM 534 is configured to multiply a real number times a complex number. Each of the listed components 502, 504, 508, 524 is well known to those having ordinary skill in the art, and therefore will not be described in detail herein. However, a brief discussion of the listed components 502, 504, 508, 524 is provided to assist a reader in understanding the CQAM system 500.

Referring again to FIG. 5, the DSG 502 is configured to generate a serial digital data stream. The data stream includes voice data, video data, text data, and/or the like. The DSG 502 is also configured to communicate the serial digital data stream to the DTBM 504. The DTBM 504 is configured to amplitude modulate the serial digital data stream in accordance with a quadrature amplitude modulation (QAM) scheme. Such QAM schemes include, but are not limited to, a sixteen QAM (16-QAM) scheme and a thirty-two QAM (32-QAM) scheme.

The GRNSG 508 is configured to generate a first Gaussian random number sequence (GRNS) 554 and communicate the same to the computation device 520. Similarly, the GRNSG 524 is configured to generate a second Gaussian random number sequence (GRNS) 558 and communicate the same to the computation device 520.

The MSRO 506 is configured to generate a square root amplitude signal (SRAS) 552 and communicate the same to the computation device 520. The baseband symbols generated by the DTBM 504 can be represented by the expressions $S(SP_1)$, $S(SP_2)$, ... $S(SP_N)$ and defined by the following mathematical equations (29)-(31)

$$S(SP_1) = RE\{S(SP_1)\} + j*IM\{S(SP_1)\} = |S(SP_1)|e^{jPHI(SP1)} \quad (29)$$

$$S(SP_2) = RE\{S(SP_2)\} + j*IM\{S(SP_2)\} = |S(SP_2)|e^{jPHI(SP2)} \quad (30)$$

...

$$S(SP_N) = RE\{S(SP_N)\} + j*IM\{S(SP_N)\} = |S(SP_N)|e^{jPHI(SPN)} \quad (31)$$

where $S(SP_1)$ is a first baseband symbol generated by the DTBM 504. $S(SP_2)$ is a second baseband symbol generated by the DTBM 504. $S(SP_N)$ is an $N^{th}$ baseband symbol generated by the DTBM 504.

Upon receipt of the baseband symbols $S(SP_1)$, $S(SP_2)$, ... $S(SP_N)$, the MSRO 506 computes a plurality of outputs. The outputs can be defined by the following mathematical equations (32)-(34)

$$V(SP_1) = RE\{S(SP_1)\}/\mathrm{sqrt}(|S(SP_1)|) + j*IM\{S(SP_1)\}/\mathrm{sqrt}(|S(SP_1)|) = |S(SP_1)|e^{jPHI(SP1)}/\mathrm{sqrt}(|S(SP_1)|) \quad (32)$$

$$V(SP_2) = RE\{S(SP_2)\}/\mathrm{sqrt}(|S(SP_2)|) + j*IM\{S(SP_2)\}/\mathrm{sqrt}(|S(SP_2)|) = |S(SP_2)|e^{jPHI(SP2)}/\mathrm{sqrt}(|S(SP_2)|) \quad (33)$$

...

$$V(SP_N) = RE\{S(SP_N)\}/\mathrm{sqrt}(|S(SP_N)|) + j*IM\{S(SP_N)\}/\mathrm{sqrt}(|S(SP_N)|) = |S(SP_N)|e^{jPHI(SPN)}/\mathrm{sqrt}(|S(SP_N)|) \quad (34)$$

where $V(SP_1)$ is a first result of a first computation performed by the MSRO 506. $V(SP_2)$ is a second result of a second computation performed by the MSRO 506. $V(SP_N)$ is an $N^{th}$ result of an $N^{th}$ computation performed by the MSRO 506.

The computation device 532 of the CSG 530 is configured to receive an output from the DTBM 504. Upon receipt of the DTBM 504 output, the computation device 532 computes the square root of one minus the magnitude of the current symbol divided by the magnitude of the current symbol. This square root operation is performed to generate a real scale factor. The real scale factors can be defined by mathematical equations (35)-(37).

$$SF(SP_1) = \mathrm{sqrt}((1-|S(SP_1)|)/|S(SP_1)|) \quad (35)$$

$$SF(SP_2) = \mathrm{sqrt}((1-|S(SP_2)|)/|S(SP_2)|) \quad (36)$$

...

$$SF(SP_N) = \mathrm{sqrt}((1-|S(SP_N)|)/|S(SP_N)|) \quad (37)$$

where $SF(SP_1)$ is a first real scale factor generated by the computation device 532 of the CSG 530. $SF(SP_2)$ is a second scale factor generated by the computation device 532 of the CSG 530. $SF(SP_N)$ is an $N^{th}$ scale factor generated by the computation device 532 of the CSG 530.

The RTCM 534 of the CSG 530 is configured to receive the square root amplitude signal (SRAS) 552 of the MSRO 506. Upon receipt of the SRAS 552, the RTCM 534 multiplies the in-phase and the quadrature-phase parts of SRAS 552 by a real value. The real value is computed by the computation device 532. The multiplication operation is performed to produce a complementary quadrature signal 556. The result of the multiplication operation can be defined by the following mathematical equations (38)-(40).

$$C(SP_1) = SF(SP_1) \cdot S(SP_1) = \mathrm{sqrt}((1-|S(SP_1)|)/|S(SP_1)|) \cdot (RE\{S(SP_1)\}/\mathrm{sqrt}(|S(SP_1)|) + j \cdot IM\{S(SP_1)\}/\mathrm{sqrt}(|S(SP_1)|)) = (\mathrm{sgn}(RE\{S(SP_1)\}) + j \cdot (\mathrm{sgn}(IM\{S(SP_1)\})) \cdot \mathrm{sqrt}(1-S(SP_1)|) \quad (38)$$

$$C(SP_2) = SF(SP_2) \cdot S(SP_2) = \mathrm{sqrt}((1-|S(SP_2)|)/|S(SP_2)|) \cdot (RE\{S(SP_2)\}/\mathrm{sqrt}(|S(SP_2)|) + j \cdot IM\{S(SP_2)\}/\mathrm{sqrt}(|S(SP_2)|)) = (\mathrm{sgn}(RE\{S(SP_2)\}) + j \cdot (\mathrm{sgn}(IM\{S(SP_2)\})) \cdot \mathrm{sqrt}(1-|S(SP_2)|) \quad (39)$$

...

$$C(SP_N) = SF(SP_N) \cdot S(SP_N) = \mathrm{sqrt}((1-|S(SP_N)|)/|S(SP_N)|) \cdot (RE\{S(SP_N)\}/\mathrm{sqrt}(|S(SP_N)|) + j \cdot IM\{S(SP_N)\}/\mathrm{SQRT}(|S(SP_N)|)) = (\mathrm{sgn}(RE\{S(SP_N)\}) + j \cdot (\mathrm{sgn}(IM\{S(SP_N)\})) \cdot \mathrm{sqrt}(1-|S(SP_N)|) \quad (40)$$

where $C(SP_1)$ is the result of a first multiplication operation performed by the computation device 532. $C(SP_2)$ is the result of a second multiplication operation performed by the computation device 532. $C(SP_N)$ is the result of an $N^{th}$ multiplication operation performed by the computation device 532. $\mathrm{Sgn}(RE\{S(SP_N)\})$ is the sign of the real part of a baseband symbol $S(SP_N)$. $\mathrm{Sgn}(IM\{S(SP_N)\})$ is the sign of the imaginary part of a baseband symbol $S(SP_N)$.

The computation device 520 is configured to process the received SRAS 552, GRNSs 554, 558, and complementary quadrature signal 556. In this regard, it should be understood that the computation device 520 is comprised of complex multipliers 512, 514 and a complex adder 516. Each of the listed components 512, 514, 516 is well known to those having ordinary skill in the art, and therefore will not be described in detail herein. However, a brief discussion of the computation device 520 is provided to assist a reader in understanding the invention.

Referring again to FIG. 5, the complex multiplier 512 is configured to generate a first product signal (FPS) 564 by performing multiplication operations using the SRAS 552 and the FGRNS 554. More particularly, the complex multiplier 512 is configured to multiply each of the symbols of the SRAS 552 by L random numbers of the FGSRN 554. These multiplication operations are defined by the following mathematical equations (41)-(45).

$$R_{512\text{-}1} = V(SP_1) \cdot FSRN_1 \quad (41)$$

$$R_{512\text{-}2} = V(SP_1) \cdot FSRN_2 \quad (42)$$

...

$$R_{512\text{-}L} = V(SP_1) \cdot FSRN_L \quad (43)$$

$$R_{512\text{-}L+1} = V(SP_2) \cdot FSRN_{L+1} \quad (44)$$

...

$$R_{512\text{-}M} = V(SP_N) \cdot FSRN_M \quad (45)$$

where $R_{512\text{-}1}$ is a result of a first multiplication operation performed by the complex multiplier 512. $R_{512\text{-}2}$ is a result of a second multiplication operation performed by the complex multiplier 512. $R_{512\text{-}L}$ is a result of an $L^{th}$ multiplication operation performed by the complex multiplier 512. $R_{512\text{-}L+1}$ is a result of an $(L+1)^{th}$ multiplication operation performed by the complex multiplier 512. $R_{512\text{-}M}$ is a result of an $M^{th}$ multiplication operation performed by the complex multiplier 512. The complex multiplier 512 is further configured to communicate the FPS 564 including the results $R_{512-1}$, $R_{512-2}, \ldots, R_{512-L}, R_{512-L+1}, \ldots, R_{512-M}$ to the complex adder 516.

The complex multiplier 514 is configured to generate a second product signal 562 by performing multiplication operations using the complementary quadrature signal 556 and the SSRN 558. More particularly, the complex multiplier 514 is configured to multiply each of the symbols of the complementary quadrature signal by L random numbers of the SSRN 558. These multiplication operations can be defined by the following mathematical equations (46)-(50).

$$R_{514-1} = C(SP_1) \cdot SSRN_1 \quad (46)$$

$$R_{514-2} = C(SP_1) \cdot SSRN_2 \quad (47)$$

...

$$R_{514-L} = C(SP_1) \cdot SSRN_L \quad (48)$$

$$R_{514-L+1} = C(SP_2) \cdot SSRN_{L+1} \quad (49)$$

...

$$R_{514-M} = C(SP_N) \cdot SSRN_M \quad (50)$$

where $R_{514-1}$ is a result of a first multiplication operation performed by the complex multiplier 514. $R_{514-2}$ is a result of a second multiplication operation performed by the complex multiplier 514. $R_{514-L}$ is a result of an $L^{th}$ multiplication operation performed by the complex multiplier 514. $R_{514-L+1}$ is a result of an $(L+1)^{th}$ multiplication operation performed by the complex multiplier 514. $R_{514-M}$ is a result of an $M^{th}$ multiplication operation performed by the complex multiplier 514. The complex multiplier 514 is further configured to communicate a second product signal (SPS) 562 including the results $R_{514-1}, R_{514-2}, \ldots, R_{514-L}, R_{514-L+1}, \ldots, R_{514-M}$ to the complex adder 516.

The complex adder 516 is configured to generate a quadrature combined output signal (QCOS) 570 by performing addition operations using the results $R_{512-1}, R_{512-2}, \ldots, R_{512-M}, R_{514-1}, R_{514-2}, \ldots, R_{514-M}$ received from the complex multipliers 512, 514. More particularly, the complex adder 516 is configured to add together results of the FPS 564 and results of the SPS 562, respectively. These addition operations can be defined by the following mathematical equations (51)-(53).

$$Sum_{516-1} = R_{512-1} + R_{514-1} \quad (51)$$

$$Sum_{516-2} = R_{512-2} + R_{514-2} \quad (52)$$

...

$$Sum_{516-M} = R_{512-M} + R_{514-M} \quad (53)$$

where $Sum_{516-1}$ is a result of a first addition operation performed by the complex adder 516. $Sum_{516-2}$ is a result of a second addition operation performed by the complex adder 516. $Sum_{516-M}$ is a result of an $M^{th}$ addition operation performed by the complex adder 516.

The complex adder 516 is also configured to communicate the QCOS 570 including the sums $Sum_{516-1}, Sum_{516-2}, \ldots, Sum_{516-M}$ to an external device (not shown). As should be understood, the external device (not shown) can include radio frequency (RF) hardware of a transmitter. RF hardware and transmitters are well known to those skilled in the art, and therefore will not be described in great detail herein.

Figure 6:
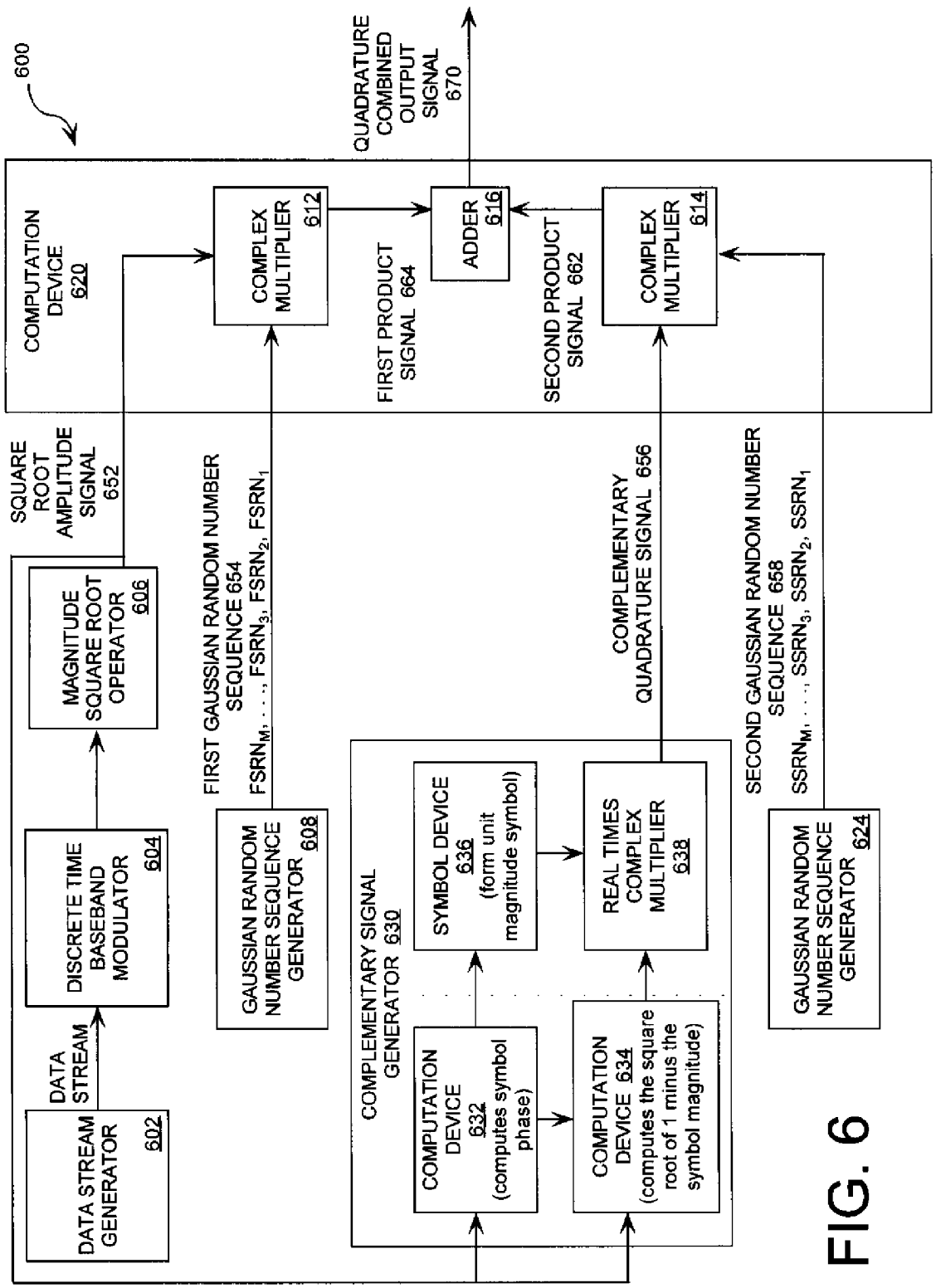
FIG. 6 is a block diagram of a second embodiment of a chaotic quadrature amplitude modulation system that is useful for understanding the present invention.

Referring now to FIG. 6, there is provided a block diagram of a third arrangement of the inventive concepts that is useful for understanding the invention. The system 600 of FIG. 6 is similar to the systems 400, 500 of FIGS. 4-5. However, the system 600 is a chaotic quadrature amplitude modulation (CQAM) system. As shown in FIG. 6, the CQAM system 600 is comprised of a data stream generator (DSG) 602, a discrete time baseband modulator (DTBM) 604, a magnitude square root operator (MSRO) 606, Gaussian random number sequence generators (GRNSGs) 608, 624, a complementary signal generator (CSG) 630, and a computation device 620. Each of the listed components 602, 604, 608, 624 is well known to those having ordinary skill in the art, and therefore will not be described in great detail herein. However, a brief discussion of the listed components 602, 604, 608, 624 is provided to assist a reader in understanding the CQAM system 600.

Referring again to FIG. 6, the DSG 602 is configured to generate a serial digital data stream. The data stream includes voice data, video data, text data, and/or the like. The DSG 602 is also configured to communicate the serial digital data stream to the DTBM 604. The DTBM 604 is configured to amplitude modulate the serial digital data stream in accordance with a quadrature amplitude modulation (QAM) scheme. Such QAM schemes include, but are not limited to, a sixteen QAM (16-QAM) scheme and a thirty-two QAM (32-QAM) scheme.

The GRNSG 608 is configured to generate a first Gaussian random number sequence (FGRNS) 654 and communicate the same to the computation device 620. Similarly, the GRNSG 624 is configured to generate a second Gaussian random number sequence (SGRNS) 658 and communicate the same to the computation device 620.

The MSRO 606 is configured to generate a square root amplitude signal (SRAS) 652 and communicate the same to the computation device 620. The baseband symbols generated by the DTBM 604 can be represented by the expressions $S(SP_1), S(SP_2), \ldots, S(SP_N)$ and defined by the following mathematical equations (54)-(56)

$$S(SP_1) = RE\{S(SP_1)\} + j^*IM\{S(SP_1)\} = |S(SP_1)|e^{jPHI(SP_1)} \quad (54)$$

$$S(SP_2) = RE\{S(SP_2)\} + j^*IM\{S(SP_2)\} = |S(SP_2)|e^{jPHI(SP_2)} \quad (55)$$

...

$$S(SP_N) = RE\{S(SP_N)\} + j^*IM\{S(SP_N)\} = |S(SP_N)|e^{jPHI(SP_N)} \quad (56)$$

where $S(SP_1)$ is a first baseband symbol generated by the DTBM 604. $S(SP_2)$ is a second baseband symbol generated by the DTBM 604. $S(SP_N)$ is an $N^{th}$ baseband symbol generated by the DTBM 604.

Upon receipt of the baseband symbols $S(SP_1), S(SP_2), \ldots, S(SP_N)$, the MSRO 606 computes a plurality of outputs. The outputs can be defined by the following mathematical equations (57)-(59).

$$V(SP_1) = RE\{S(SP_1)\}/\text{sqrt}(|S(SP_1)|) + j^*IM\{S(SP_1)\}/\text{sqrt}(|S(SP_1)|) = |S(SP_1)|e^{jPHI(SP_1)}/\text{sqrt}(|S(SP_1)|) = \text{sqrt}(|S(SP_1)|)e^{jPHI(SP_1)} \quad (57)$$

$$V(SP_2) = RE\{S(SP_2)\}/\text{sqrt}(|S(SP_2)|) + j^*IM\{S(SP_2)\}/\text{sqrt}(|S(SP_2)|) = |S(SP_2)|e^{jPHI(SP_2)}/\text{sqrt}(|S(SP_2)|) = \text{sqrt}(|S(SP_2)|)e^{jPHI(SP_2)} \quad (58)$$

...

$$V(SP_N) = RE\{S(SP_N)\}/\text{sqrt}(|S(SP_N)|) + j^*IM\{S(SP_N)\}/\text{sqrt}(|S(SP_N)|) = |S(SP_N)|e^{jPHI(SP_N)}/\text{sqrt}(|S(SP_N)|) = \text{sqrt}(|S(SP_N)|)e^{jPHI(SP_N)} \quad (59)$$

where $V(SP_1)$ is a first result of a first computation performed by the MSRO 606. $V(SP_2)$ is a second result of a second computation performed by the MSRO 606. V(SP$_N$) is an N$^{th}$ result of an N$^{th}$ computation performed by the MSRO 606.

The CSG 630 is comprised of computation devices 632, 634, a symbol device 636, and a real times complex multiplier (RTCM) 638. The computation device 632 is configured to receive the SRAS 652 from the MSRO 606. Upon receipt of the SRAS 652, the computation device 632 computes the phase angle phi of the SRAS 652. Thereafter, the computation device 632 communicates the computed phase angle phi to the computation device 634.

The computation device 634 is configured to compute the square root of one minus the magnitude squared of the SRAS 652. If the outputs of the DTBM 604 are represented by the following expressions P(SP$_1$), P(SP$_2$), ..., P(SP$_N$) and the outputs of the MSRO 606 are represented by the following expressions S(SP$_1$), S(SP$_2$), ..., S(SP$_N$), then the outputs of the computation device 634 can be expressed by the following mathematical equations (60)-(62).

$$SF(SP_1) = \text{sqrt}((1-|S(SP_1)|^2) = \text{sqrt}(1-|P(SP_1)|) \quad (60)$$

$$SF(SP_2) = \text{sqrt}((1-|S(SP_2)|^2) = \text{sqrt}(1-|P(SP_2)|) \quad (61)$$

...

$$SF(SP_N) = \text{sqrt}((1-|S(SP_N)|^2) = \text{sqrt}(1-|P(SP_N)|) \quad (62)$$

where SF(SP$_1$) is a first real scale factor generated by the computation device 634 of the CSG 630. SF(SP$_2$) is a second scale factor generated by the computation device 634 of the CSG 630. SF(SP$_N$) is an N$^{th}$ scale factor generated by the computation device 634 of the CSG 630.

The symbol device 636 is configured to form unit magnitude quadrature symbols using the phase PHI of each symbol S(SP$_1$), S(SP$_2$), ..., S(SP$_N$). The unit magnitude quadrature symbols can be defined by the following mathematical equations (63)-(65).

$$B(SP_1) = e^{jPHI(SP_1)} \quad (63)$$

$$B(SP_2) = e^{jPHI(SP_2)} \quad (64)$$

...

$$B(SP_N) = e^{jPHI(SP_N)} \quad (65)$$

where B(SP$_1$) is a first unit magnitude quadrature symbol generated by the symbol device 636 using the phase of a first input symbol PHI(SP$_1$). B(SP$_2$) is a second unit magnitude quadrature symbol generated by the symbol device 636 using the phase of a second input symbol PHI(SP$_2$). B(SP$_N$) is an N$^{th}$ unit magnitude quadrature symbol generated by the symbol device 636 using the phase of an N$^{th}$ input symbol PHI (SP$_N$).

The RTCM 638 is configured to receive the real scale factors SF(SP$_1$), ..., SF(SP$_N$) from the computation device 634 and unit magnitude quadrature symbols B(SP$_1$), ..., B(SP$_N$) from the symbol device 636. Upon receipt of the real scale factors SF(SP$_1$), ..., SF(SP$_N$) and unit magnitude quadrature symbols B(SP$_1$), ..., B(SP$_N$), the RTCM multiplies the in-phase and the quadrature-phase parts of the unit magnitude symbols B(SP$_1$), ..., B(SP$_N$) by a real value. The real value is computed by computation device 634. These multiplication operations are performed to produce a complementary quadrature signal 656. The results of these multiplication operations can be defined by the following mathematical equations (66)-(68).

$$C(SP_1) = SF(SP_1) \cdot B(SP_1) = \text{sqrt}(1-|P(SP_1)|)e^{jPHI(SP_1)} \quad (66)$$

$$C(SP_2) = SF(SP_2) \cdot B(SP_2) = \text{sqrt}(1-|P(SP_2)|)e^{jPHI(SP_2)} \quad (67)$$

...

$$C(SP_N) = SF(SP_N) \cdot B(SP_N) = \text{sqrt}(1-|P(SP_N)|)e^{jPHI(SP_N)} \quad (68)$$

where C(SP$_1$) is the result of a first multiplication operation performed by the computation device 634. C(SP$_2$) is the result of a second multiplication operation performed by the computation device 634. C(SP$_N$) is the result of an N$^{th}$ multiplication operation performed by the computation device 634.

The computation device 620 is configured to receive the SRAS 652 from the MSRO 606, the FGRNS from the GRNSG 608, the complimentary quadrature signal 656 from the CSG 630, and the SGRNS 658 from the GRNSG 624. The computation device 620 is configured to process the received signals 652, 654, 656, 658. In this regard, it should be understood that the computation device 620 is comprised of complex multipliers 612, 614 and a complex adder 616. Each of the listed components 612, 614, 616 is well known to those having ordinary skill in the art, and therefore will not be described in detail herein. However, a brief discussion of the computation device 620 is provided to assist a reader in understanding the present invention.

Referring again to FIG. 6, the complex multiplier 612 is configured to generate a first product signal (FPS) 664 by performing multiplication operations using the SRAS 652 and the FGRNS 654. More particularly, the complex multiplier 612 is configured to multiply each of the SRAS 652 symbols by L random numbers of the FGSRN 654. These multiplication operations can be defined by the following mathematical equations (69)-(73).

$$R_{612-1} = S(SP_1) \cdot FSRN_1 \quad (69)$$

$$R_{612-2} = S(SP_1) \cdot FSRN_2 \quad (70)$$

...

$$R_{612-L} = S(SP_1) \cdot FSRN_L \quad (71)$$

$$R_{612-L+1} = S(SP_2) \cdot FSRN_{L+1} \quad (72)$$

...

$$R_{612-M} = S(SP_N) \cdot FSRN_M \quad (73)$$

where R$_{612-1}$ is a result of a first multiplication operation performed by the complex multiplier 612. R$_{612-2}$ is a result of a second multiplication operation performed by the complex multiplier 612. R$_{612-L}$ is a result of an L$^{th}$ multiplication operation performed by the complex multiplier 612. R$_{612-L+1}$ is a result of an (L+1)$^{th}$ multiplication operation performed by the complex multiplier 612. R$_{612-M}$ is a result of an M$^{th}$ multiplication operation performed by the complex multiplier 612. The complex multiplier 612 is further configured to communicate the FPS 664 including the results R$_{612-1}$, R$_{612-2}$, ..., R$_{612-L}$, R$_{612-L+1}$, ..., R$_{612-N}$ to the complex adder 616.

The complex multiplier 614 is configured to receive the complimentary quadrature signal (CQS) 656 from the CSG 630 and the SGRNS 658 from the GRNSG 624. Upon receipt of the signals 656, 658, the complex multiplier 614 generates a second product signal (SPS) 662. The SPS 662 is generated by performing multiplication operations using the received signals 656, 658. More particularly, the complex multiplier 614 is configured to multiply each of the CQS 656 symbols by L random numbers of the SGSRN 658. These multiplication operations can be defined by the following mathematical equations (74)-(78).

$$R_{614-1} = C(SP_1) \cdot SSRN_1 \quad (74)$$

$$R_{614-2} = C(SP_1) \cdot SSRN_2 \quad (75)$$

...

$$R_{614-L} = C(SP_1) \cdot SSRN_L \qquad (76)$$

$$R_{614-L+1} = C(SP_2) \cdot SSRN_{L+1} \qquad (77)$$

$$\ldots$$

$$R_{614-M} = C(SP_N) \cdot SSRN_M \qquad (78)$$

where $R_{614-1}$ is a result of a first multiplication operation performed by the complex multiplier 614. $R_{614-2}$ is a result of a second multiplication operation performed by the complex multiplier 614. $R_{614-L}$ is a result of an $L^{th}$ multiplication operation performed by the complex multiplier 614. $R_{614-L+1}$ is a result of an $(L+1)^{th}$ multiplication operation performed by the complex multiplier 614. $R_{614-M}$ is a result of an $M^{th}$ multiplication operation performed by the complex multiplier 614. The complex multiplier 614 is further configured to communicate the SPS 662 including the results $R_{614-1}$, $R_{614-2}, \ldots, R_{614-L}, R_{614-L+1}, \ldots, R_{614-M}$ to the complex adder 616.

The complex adder 616 is configured to generate a quadrature combined output signal (QCOS) 670 by performing addition operations using the results $R_{612-1}, R_{612-2}, \ldots, R_{612-M}, R_{614-1}, R_{614-2}, \ldots, R_{614-M}$ received from the complex multipliers 612, 614. More particularly, the complex adder 616 is configured to add together results of the FPS 664 and results of the SPS 662, respectively. These addition operations can be defined by the following mathematical equations (79)-(81).

$$\text{Sum}_{616-1} = R_{612-1} + R_{614-1} \qquad (79)$$

$$\text{Sum}_{616-2} = R_{612-2} + R_{614-2} \qquad (80)$$

$$\ldots$$

$$\text{Sum}_{616-M} = R_{612-M} + R_{614-M} \qquad (81)$$

where $\text{Sum}_{616-1}$ is a result of a first addition operation performed by the complex adder 616. $\text{Sum}_{616-2}$ is a result of a second addition operation performed by the complex adder 616. $\text{Sum}_{616-M}$ is a result of an $M^{th}$ addition operation performed by the complex adder 616.

The complex adder 616 is also configured to communicate the QCOS 670 to an external device (not shown). As should be understood, the external device (not shown) can include radio frequency (RF) hardware of a transmitter. RF hardware and transmitters are well known to those having ordinary skill in the art, and therefore will not be described herein.

Figure 7:
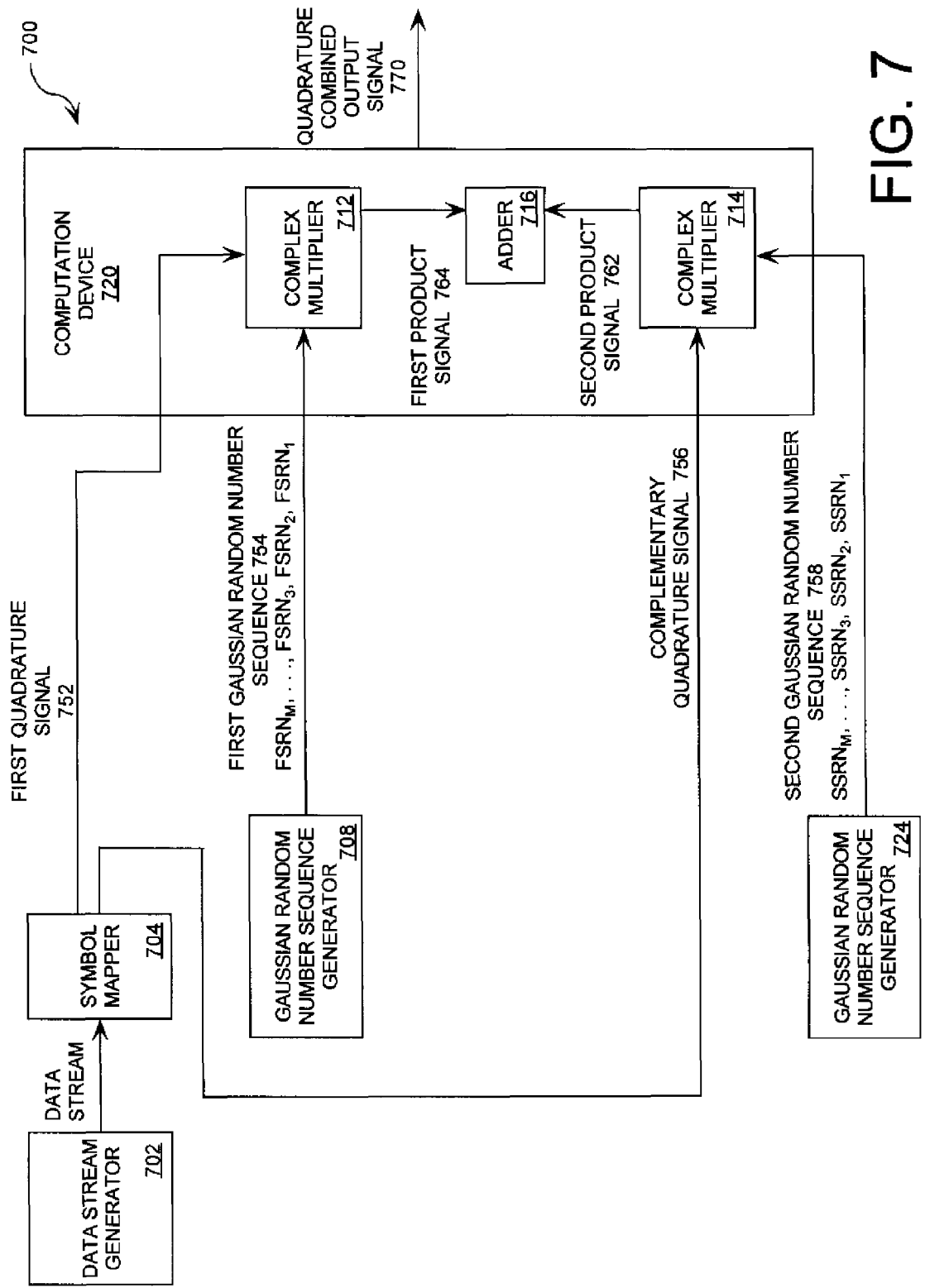
FIG. 7 is a block diagram of a third embodiment of a chaotic quadrature amplitude modulation system that is useful for understanding the present invention.

Referring now to FIG. 7, there is provided a block diagram of a chaotic quadrature amplitude modulation (CQAM) system 700. The CQAM system 700 is comprised of a data stream generator (DSG) 702, a symbol mapper 704, Gaussian random number sequence generators (GRNSGs) 708, 724, and a computation device 720. Each of the listed components 702, 704, 708, 724 is well known to those skilled in the art, and therefore will not be described in great detail herein. However, a brief discussion of the listed components 702, 704, 708, 724 is provided to assist a reader in understanding the CQAM system 700.

Referring again to FIG. 7, the DSG 702 is configured to generate a serial digital data stream. The data stream includes, but is not limited to, voice data, video data, and/or text data. The DSG 702 is also configured to communicate the serial digital data stream to the symbol mapper 704. The symbol mapper 704 is configured to amplitude modulate the serial digital data stream in accordance with a constant variance chaotic amplitude and phase modulation scheme. Such schemes include, but are not limited to, a sixteen QAM (16-QAM) scheme and a thirty-two QAM (32-QAM) scheme.

More particularly, the symbol mapper 704 is configured to generate a first quadrature signal 752 and a complimentary quadrature signal 756. The signals 752, 756 have complimentary amplitudes and the same phases. It this regard, it should be understood that the symbol mapper 704 simultaneously generates outputs $S(SP_1)$ and $C(SP_1)$. The symbol mapper 704 also simultaneously generates outputs $S(SP_2)$ and $C(SP_2)$, and so on. After generating a pair of outputs, the symbol mapper 704 communicates the same to the computation device 720.

The GRNSG 708 is configured to generate a first Gaussian random number sequence (GRNS) 754 and communicate the same to the computation device 720. Similarly, the GRNSG 724 is configured to generate a second Gaussian random number sequence (GRNS) 758 and communicate the same to the computation device 720.

The computation device 720 is configured to process a received first quadrature signal 752, GRNSs 754, 758, and quadrature complementary signal 756. In this regard, it should be understood that the computation device 720 is comprised of complex multipliers 712, 714 and an adder 716. The complex multiplier 712 is configured to generate a first product signal 764 by performing multiplication operations using the first quadrature signal 752 and the first GRNS 754. These multiplication operations can involve multiplying each of the first quadrature signal symbols by L random numbers of the first GSRN 754.

Similarly, the complex multiplier 714 is configured to generate a second product signal 762 by performing multiplication operations using the complementary quadrature signal 756 and the second GSRN 758. These multiplication operations can involve multiplying each of the complementary quadrature signal symbols by L random numbers of the second GRN 758.

The adder 716 is configured to generate a quadrature combined output signal (QCOS) 770 by performing addition operations using the results received from the complex multipliers 712, 714. More particularly, the adder 716 is configured to add together results of the first product signal 764 and results of the second product signal 762, respectively.

The adder 716 is also configured to communicate the QCOS 770 to an external device (not shown). As should be understood, the external device (not shown) can include radio frequency (RF) hardware of a transmitter. RF hardware and transmitters are well known to those skilled in the art, and therefore will not be described in great detail herein.

Referring now to FIG. 8, there is provided a block diagram of a constant variance, tandem arbitrary data phase single complimentary signal quadrature amplitude modulation system (QAM) system 800. As shown in FIG. 8, the QAM system 800 is comprised of a data stream generator (DSG) 802, a tandem symbol mapper 804, Gaussian random number sequence generators (GRNSGs) 808, 824, and a computation device 820. Each of the listed components 802, 804, 808, 824 is well known to those skilled in the art, and therefore will not be described in great detail herein. However, a brief discussion of the listed components 802, 804, 808, 824 is provided to assist a reader in understanding the QAM system 800.

Referring again to FIG. 8, the DSG 802 is configured to generate a serial digital data stream. The data stream includes, but is not limited to, voice data, video data, and/or text data. The DSG 802 is also configured to communicate the serial digital data stream to the tandem symbol mapper 804. The tandem symbol mapper 804 is configured to generate a first quadrature signal 852 and an amplitude complimentary quadrature signal 856. The tandem symbol mapper 804 is configured to communicate the signals 852, 824 to the computation device 820.

Notably, the tandem symbol mapper 804 is configured to provide an increased number of bits per symbol as compared to the symbol mapper 704 of FIG. 7. However, the signal-to-noise ratio for both the first quadrature signal 852 and the amplitude complimentary quadrature signal 856 is degraded. In this regard, it should be understood that the tandem symbol mapper 804 is configured to receive six (6) bits per symbol (instead of four bits per symbols received by the symbol mapper 704). The tandem mapper 804 is also configured to output signals 852, 856 having complimentary amplitudes and different phases.

The GRNSG 808 is configured to generate a first Gaussian random number sequence (GRNS) 854 and communicate the same to the computation device 820. Similarly, the GRNSG 824 is configured to generate a second Gaussian random number sequence (GRNS) 858 and communicate the same to the computation device 820.

The computation device 820 is configured to process a received first quadrature signal 852, GRNSs 854, 858, and quadrature complementary signal 856. In this regard, it should be understood that the computation device 820 is comprised of complex multipliers 812, 814 and an adder 816. The complex multiplier 812 is configured to generate a first product signal 864 by performing multiplication operations using the first quadrature signal 852 and the first GRNS 854. These multiplication operations can involve multiplying each of the first quadrature signal symbols by L random numbers of the first GSRN 854.

Similarly, the complex multiplier 814 is configured to generate a second product signal 862 by performing multiplication operations using the complementary quadrature signal 856 and the second GSRN 858. These multiplication operations can involve multiplying each of the complementary quadrature signal symbols by L random numbers of the second GRN 858.

The adder 816 is configured to generate a quadrature combined output signal (QCOS) 870 by performing addition operations using the results received from the complex multipliers 812, 814. More particularly, the adder 816 is configured to add together results of the first product signal 864 and results of the second product signal 862, respectively.

The adder 816 is also configured to communicate the QCOS 870 to an external device (not shown). As should be understood, the external device (not shown) can include radio frequency (RF) hardware of a transmitter. RF hardware and transmitters are well known to those skilled in the art, and therefore will not be described in great detail herein.

In light of the forgoing description of the invention, it should be recognized that the present invention can be realized in hardware, software, or a combination of hardware and software. A method reducing statistical artifacts existing in analog and digital amplitude modulated signals according to the present invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following: (a) conversion to another language, code or notation; (b) reproduction in a different material form. Additionally, the description above is intended by way of example only and is not intended to limit the present invention in any way, except as set forth in the following claims.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for generating a chaotic amplitude modulated signal absent of cyclostationary features by preserving a constant variance, comprising the steps of:
   generating a PAM signal including pulse amplitude modulation having a periodically changing amplitude;
   generating a first part of a constant power envelope signal (FPCPES) by dividing said PAM signal by a square root of a magnitude of said PAM signal;
   generating a second part of said constant power envelope signal (SPCPES) having a magnitude equal to a square root of one minus said magnitude of said PAM signal;
   generating first and second spreading sequences formed as sequences of random values;
   combining said FPCPES with said first spreading sequence to generate a first product signal;
   combining said SPCPES with said second spreading sequence to generate a second product signal; and
   generating a constant power envelope signal using said first and second product signals.

2. The method according to claim 1, further comprising the step of selecting each of said first and second spreading sequences to be orthogonal chaotic sequences.

3. The method according to claim 1, further comprising the step of generating said PAM signal using discrete time baseband modulation to form AM symbols.

4. The method according to claim 3, further comprising selecting said discrete time baseband modulation to comprise quadrature amplitude modulation (QAM).

5. The method according to claim 4, wherein each of said AM symdols is encoded as an inphase component "I" and a quadrature component "Q".

6. The method according to claim 1, further comprising the steps of:
   transmitting said constant power envelope signal over a communication link to a receiver;
   generating at the receiver a third spreading sequence which is identical to said first spreading sequence; and correlating said constant power envelope signal with said third spreading sequence to recover said PAM signal.

7. The method according to claim 6, futher comprising the steps of:
generating at said receiver a fourth spreading sequence which is identical to said second spreading sequence; and
correlating said constant power envelope signal with said fourth spreading sequence to recover said SPCPES.

8. A method for generating a coherent communication signal, comprising the steps of:
generating a first baseband pulse amplitude modulated signal;
generating a second baseband pulse amplitude modulated signal such that said first and second baseband pulse amplitude modulated signals generate output signals with variances that are compliments of each other;
computing a plurality of first square root values by taking the square roots of each of a plurality of magnitude values of said first baseband pulse amplitude modulated signal;
computing a plurality of second square root values by taking the square roots of each of a plurality of magnitude values of said second baseband pulse amplitude modulated signal;
generating first and second spreading sequences formed as sequences of random values;
combining each square root value of said plurality of first square root values with a respective random number of said first spreading sequence to generate a first spread spectrum signal;
combining each square root value of said plurality of second square root values with respective random numbers of said second spreading sequence to generate a second spread spectrum signal; and
combining said first spread spectrum signal and said second spread spectrum signal to form a composite spread signal.

9. The method according to claim 8, further comprising the step of selecting each of said first and second spreading sequences to be chaotic sequences.

10. The method according to claim 8, further comprising the step of forming each of said first and second pulse amplitude modulated signals using quadrature amplitude mochilfltion (QAM) to form QAM symbols.

11. The method according to claim 10, wherein each said QAM symbol of said first baseband pulse amplitude modulated signal is encoded as an in-phase component I and a quadrature component Q, and said second pulse amplitude modulated signal is encoded as I compliment, which is a compliment of I, and a Q compliment, which is a compliment of Q.

12. The method according to claim 8 further comprising the steps of:
transmitting said composite signal over a communications links to a receiver;
generating at said receiver a third spreading sequence which is identical to said first spreading sequence; and
correlating said composite spread spectrum signal with said spreading sequence to recover said first baseband pulse amplitude modulated signal.

13. The method according to claim 12, further comprising the steps of:
generating at said receiver a fourth spreading sequence which is identical to said spreading sequence; and
correlating said composite spread spectrum signal with said fourth spreading sequence to recover said second baseband pulse amplitude modulated signal.

14. The method according to claim 8, wherein said second baseband pulse amplitude modulated signal has an amplitude which is a compliment of an amplitude of said first baseband pulse amplitude modulated signal and a phase which is the same as a phase of said first baseband pulse amplitude modulated signal.

15. The method according to claim 8, wherein said second baseband pulse amplitude modulated signal has an amplitude which is a compliment of an amplitude of said first baseband pulse amplitude modulated signal and a phase which is different from a phase of said first baseband pulse amplitude modulated signal.

16. A system, comprising:
a first generator configured for generating a PAM signal including pulse amplitude modulation having a periodically changing amplitude;
a second generator configured for generating a first part of a constant power envelope signal (FPCPES) by dividing said PAM signal by a square root of a magnitude of said PAM signal;
a third generator configured for generating a second part of said constant power envelope signal (SPCPES) having a magnitude equal to a square root of one minus said magnitude of said PAM signal;
a fourth generator configured for generating first and second spreading sequences formed as a sequence of random values;
a first combiner configured for combining said FPCPES with said first spreading sequence to generate a first product signal;
a second combiner configured for combining said SPCPES with said second spreading sequence to generate a second product signal; and
a fifth generator configured for generating a constant power envelope signal using said first and second product signals.

17. The system according to claim 16, wherein each of said first and second spreading sequences are orthogonal chaotic sequences.

18. The system according to claim 16, wherein said PAM signal is generated using discrete time baseband modulation to form AM symbols.

19. The system according to claim 18, wherein said discrete time baseband modulation is quadrature amplitude modulation (QAM).

20. The system according to claim 19, wherein each of said AM symbols is encoded as an imphase component "I" and a quadrature component "Q".

21. The system according to claim 16, further comprising a transmitter configured for transmitting said constant power envelope signal to a receiver over a communications link.

22. The system according to claim 21, wherein said receiver is configured for generating a third spreading sequence which is identical to said first spreading sequence and correlating said constant power envelope signal with said third spreading sequence to recover said PAM signal.

23. The system according to claim 21, wherein said receiver is configured for generating a fourth spreading sequence which is identical to said second spreading sequence and correlating said constant power envelope signal with said third spreading sequence to recover said SPCPES.

* * * * *